United States Patent
Murakami et al.

(10) Patent No.: US 9,882,614 B2
(45) Date of Patent: Jan. 30, 2018

(54) WIRELESS SIGNAL TRANSMITTING METHOD AND WIRELESS APPARATUS

(71) Applicant: NIPPON TELEGRAPH AND TELEPHONE CORPORATION, Tokyo (JP)

(72) Inventors: Tomoki Murakami, Yokosuka (JP); Yusuke Asai, Yokosuka (JP); Riichi Kudo, Yokosuka (JP); Koichi Ishihara, Yokosuka (JP); Masato Mizoguchi, Yokosuka (JP); Takeo Ichikawa, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 53 days.

(21) Appl. No.: 14/375,037

(22) PCT Filed: Feb. 4, 2013

(86) PCT No.: PCT/JP2013/052457
§ 371 (c)(1),
(2) Date: Jul. 28, 2014

(87) PCT Pub. No.: WO2013/118675
PCT Pub. Date: Aug. 15, 2013

(65) Prior Publication Data
US 2014/0376535 A1    Dec. 25, 2014

(30) Foreign Application Priority Data

Feb. 6, 2012  (JP) .................................. 2012-023086
Feb. 24, 2012 (JP) .................................. 2012-038195

(51) Int. Cl.
H04B 7/04      (2017.01)
H04B 7/0452   (2017.01)
(Continued)

(52) U.S. Cl.
CPC .......... *H04B 7/0452* (2013.01); *H04B 7/024* (2013.01); *H04B 7/0456* (2013.01);
(Continued)

(58) Field of Classification Search
CPC . H04B 7/0452; H04B 7/0456; H04L 27/2613; H04L 5/005; H04J 11/0053
See application file for complete search history.

(56) References Cited

U.S. PATENT DOCUMENTS

2002/0085653 A1* 7/2002 Matsuoka .............. H01Q 1/246
                                                          375/347
2002/0136187 A1* 9/2002 Aoyama ................ H04W 16/28
                                                          370/342
(Continued)

FOREIGN PATENT DOCUMENTS

CN    101370240 A    2/2009
CN    101371240 A    2/2009
(Continued)

OTHER PUBLICATIONS

Notice of Reasons for Rejection, Japanese Patent Application No. 2013-557503, dated May 19, 2015.
(Continued)

*Primary Examiner* — Mohammad Anwar
(74) *Attorney, Agent, or Firm* — Harness, Dickey & Pierce, P.L.C.

(57) ABSTRACT

Interference in preamble signals and pilot signals in cooperative transmission using interference suppressing technology is avoided. A wireless apparatus for transmitting a wireless signal on which directivity control has been performed to stations in a wireless system including at least one wireless apparatus is provided with a known signal generating unit which generates a known signal to be added to the wireless signal, a weighting processing unit which performs
(Continued)

weighting on the known signal generated by the known signal generating unit, and a wireless processing unit which transmits the known signal on which the weighting has been performed by the weighting processing unit.

17 Claims, 24 Drawing Sheets

(51) Int. Cl.
    *H04W 28/16*     (2009.01)
    *H04B 7/024*     (2017.01)
    *H04B 7/06*     (2006.01)
    *H04B 7/0456*     (2017.01)
    *H04W 88/08*     (2009.01)
    *H04J 11/00*     (2006.01)
    *H04L 5/00*     (2006.01)
    *H04L 27/26*     (2006.01)

(52) U.S. Cl.
    CPC ........ *H04B 7/0617* (2013.01); *H04J 11/0053* (2013.01); *H04L 5/005* (2013.01); *H04L 27/2613* (2013.01); *H04W 28/16* (2013.01); *H04W 88/08* (2013.01); *H04L 5/0035* (2013.01); *H04L 27/2626* (2013.01)

(56) References Cited

U.S. PATENT DOCUMENTS

| | | | | |
|---|---|---|---|---|
| 2005/0129137 | A1* | 6/2005 | Yamada | H04B 7/0417 375/267 |
| 2005/0201268 | A1* | 9/2005 | Aoki | H04B 7/10 370/208 |
| 2007/0298826 | A1* | 12/2007 | Oshima | H04B 7/0617 455/522 |
| 2008/0008258 | A1* | 1/2008 | Tanabe | H04L 25/0204 375/267 |
| 2010/0150079 | A1* | 6/2010 | Maltsev | H04L 1/06 370/329 |
| 2010/0246527 | A1* | 9/2010 | Montojo | H04L 5/005 370/330 |
| 2011/0044193 | A1 | 2/2011 | Forenza et al. | |
| 2011/0134901 | A1 | 6/2011 | Hoshino et al. | |
| 2011/0317748 | A1 | 12/2011 | Li et al. | |
| 2012/0122392 | A1* | 5/2012 | Morioka | H04B 7/0695 455/25 |

FOREIGN PATENT DOCUMENTS

| | | |
|---|---|---|
| CN | 102035619 A | 4/2011 |
| EP | 2 458 764 A1 | 5/2012 |
| JP | 2007-214995 A | 8/2007 |
| JP | 2012-023703 A | 2/2012 |
| WO | 2008/103317 A2 | 8/2008 |
| WO | WO-2010/016183 A1 | 2/2010 |
| WO | WO-2011/010433 A1 | 1/2011 |
| WO | WO-2011/034865 A1 | 3/2011 |

OTHER PUBLICATIONS

Khaled, Nadia, et al., "Interpolation-based Multi-mode Precoding for MIMO-OFDM Systems," 2005 13th European Signal Processing Conference, Sep. 4-8, 2005, pp. 1-4.
Love, David J., et al., "An Overview of Limited Feedback in Wireless Communication Systems," IEEE Journal on Selected Areas in Communications, vol. 26, No. 8, Oct. 2008, pp. 1341-1365.
Extended Search Report, European Patent Application No. 13746689.2, dated Aug. 10, 2015.
Masahiro Morikura and Shuji Kubota, "Revised Third Edition 802.11 high-speed wireless LAN textbook," pp. 206, 242, and 243, impress R&D, Mar. 27, 2008.
D. Gesbert, S. Hanly, H. Huang, S. Shitz, O. Simeone, and W. Yu, "Multi-cell MIMO cooperative networks: A new look at interference", IEEE Journal on Selected Areas in Communications, Dec. 2010.
IEEE P802.11ac/D1.0 Draft Standard for Information Technology—Telecommunications and information exchange between systems—Local and metropolitan area networks—Specific requirements Part 11: Wireless LAN Medium Access Control (MAC) and Physical Layer (PHY) specifications Amendment 5: Enhancements for Very High Throughput for Operation in Bands below 6 GHz, May 2011.
IEEE P802.11n/D11.0 Draft Standard for Information Technology—Telecommunications and information exchange between systems—Local and metropolitan area networks—Specific requirements Part 11: Wireless LAN Medium Access Control (MAC) and Physical Layer (PHY) specifications Amendment 5: Enhancements for Higher Throughput, Jun. 2009.
International Search Report for PCT/JP2013/052457, ISA/JP, dated Apr. 16, 2013.
CN Office Action CN201380007721.9, dated Mar. 31, 2017, with partial English translation of Search Report.
CN Office Action for CN201380007721.9, dated Mar. 31, 2017, with partial English translation of Search Report.
CN Office Action for CN201380007721.9, dated Oct. 24, 2017, with English translation.
IEEE Std 802.11a-1999(R2003) Part 11: Wireless LAN Medium Access Control (MAC) and Physical Layer (PHY) specifications High-speed Physical Layer in the 5 GHz Band.

\* cited by examiner

WIRELESS SIGNAL TRANSMITTING METHOD AND WIRELESS APPARATUS

CROSS REFERENCE TO RELATED APPLICATIONS

This application is a 371 U.S. National Phase of PCT/JP2013/052457, filed on Feb. 4, 2013. Priority is claimed on Japanese Patent Application No. 2012-023086, filed Feb. 6, 2012 and Japanese Patent Application No. 2012-038195, filed Feb. 24, 2012, the entire contents of which are incorporated herein by reference.

TECHNICAL FIELD

The present invention relates to a wireless signal transmitting method and a wireless apparatus using interference suppression technology in which wireless local area network (LAN) access points simultaneously transmit signals. In addition, the present invention relates to technology which performs spatial division multiplexing transmission while ensuring backward compatibility with respect to multiuser MIMO with conventional wireless apparatuses.

BACKGROUND ART

As a high-speed wireless access system using a band of 5 GHz, there is an Institute of Electrical and Electronics Engineers (IEEE) 802.11a standard. In this system, an orthogonal frequency division multiplexing (OFDM) modulation scheme, which is technology which stabilizes the performance in a multipath fading environment, is used and a maximum throughput of 54 M bits per second (bps) is realized. However, because the throughput here is throughput on the physical layer and transmission efficiency in a medium access control (MAC) layer is actually about 50 to 70%, the upper limit of the actual throughput is about 30 Mbps (e.g., see Non-Patent Document 1).

Further, IEEE 802.11n is aimed at realization of high-speed communication by: multiple-input multiple-output (MIMO) technology capable of realizing spatial multiplexing in the same frequency channel at the same time using a plurality of antennas; technology using a frequency channel of 40 MHz by simultaneously employing two frequency channels of 20 MHz which are separately used so far; and/or technology which improves efficiency such as frame aggregation in which a plurality of frames are bundled and transmitted and reduction in overhead of a control signal by using a block acknowledge (ACK) signal, and it is capable of realizing a maximum transmission speed of 600 Mbps (e.g., see Non-Patent Document 1).

In addition, recently, the demand for wireless communication has rapidly increased and access points of a wireless LAN have been installed in many places. However, there is a problem in that signals of nearby communication cells interfere with each other and excellent wireless communication cannot be realized in an environment in which the communication cells (each configured by one access point and a plurality of stations) are close to each other (in general, in a wireless communication system of a mobile phone, a wireless LAN, or the like, one access point or a communication cell including an access point and a plurality of stations is regarded as a minimum unit of a wireless network).

To address this problem, technology (cooperative transmission technology using interference suppression technology) for increasing the throughput in which each of a plurality of access points uses a plurality of antennas mounted on each access point, controls directivity of radio waves (transmission beamforming) by changing a phase rotation amount of a signal transmitted from each antenna, and performs communication of the access point itself while suppressing interference to nearby communication cells has been studied (e.g., see Non-Patent Document 2). In the interference suppression technology based on the transmission beamforming, interference suppression is performed by acquiring a propagation channel between an access point itself and an interfering station in advance, calculating transmission weights which suppress the interference from the propagation channel, and performing communication using the transmission weights. Here, the propagation channel represents a received intensity and a phase rotation amount of a signal when radio waves are propagated from transmit antennas to receive antennas.

FIG. 21 is a block diagram showing a configuration of a general wireless LAN transmitter capable of performing the transmission beamforming. As shown in FIG. 21, the wireless LAN transmitter is configured by error-correction coding units 100-1 to 100-A, interleaving processing units 101-1 to 101-A, subcarrier modulating units 103-1-1 to 103-B-A, a weighting processing unit 104, inverse fast Fourier transform (IFFT) units 105-1 to 105-C, guard interval (GI) adding units 106-1 to 106-C, radio frequency (RF) processing units 107-1 to 107-C, antennas 108-1 to 108-C, a preamble generating unit 109, a pilot subcarrier generating unit 110, a wireless signal demodulating unit 111, a propagation channel acquiring unit 112, and a weight calculating unit 113.

The error-correction coding units 100-1 to 100-A perform convolution encoding of input data. The interleaving processing units 101-1 to 101-A rearrange bits so that transmission of adjacent bits after encoding is performed in subcarriers separated as much as possible. The subcarrier modulating units 103-1-1 to 103-B-A modulate data on which an interleaving process has been performed in accordance with a modulation scheme such as binary phase shift keying (BPSK) or quadrature phase shift keying (QPSK) prescribed in a wireless LAN standard.

The weighting processing unit 104 multiplies the data by transmission weights calculated from the propagation channel for subcarriers. The IFFT units 105-1 to 105-C transform frequency-series data on which the weighting has been performed into time-series data using IFFT computation. The GI adding units 106-1 to 106-C are blocks which copy a fixed period in a rear end of an IFFT output signal and connect it to a front end of the IFFT output signal. Each of the RF processing units 107-1 to 107-C converts a baseband signal to which a GI has been added into a wireless signal using an analog RF apparatus. Each of the antennas 108-1 to 108-C radiates the wireless signal into air.

The preamble generating unit 109 generates preamble signals used to perform timing synchronization and frequency synchronization of a wireless signal configured by known signals (the preamble signals and pilot subcarrier signals). The pilot subcarrier generating unit 110 generates the pilot subcarrier signals which are configured by known signals and are used to correct a residual frequency error. The wireless signal demodulating unit 111 demodulates a wireless signal transmitted from a station and acquires a data portion included in the wireless signal. The propagation channel acquiring unit 112 acquires a propagation channel for the subcarriers acquired from the demodulated data portion and stores the propagation channel. The weight calculating unit 113 calculates the transmission weights using the propagation channel acquired for the subcarriers.

As shown in FIG. 21, the wireless LAN transmitter converts transmission data in various blocks and thus it is possible to generate and transmit a wireless LAN signal in which transmission beamforming is possible.

In addition, MIMO transmission used in IEEE 802.11n is performed between an access point (AP) and a station (STA) which face with each other, and it improves the throughput by distributing data to be transmitted to a plurality of antennas and transmitting the data in parallel with each other, i.e., by spatially multiplexing, from the plurality of antennas.

Furthermore, in IEEE 802.11 ac under development at present, research on technology called multiuser (MU)-MIMO in which an access point and a plurality of stations perform one-to-many communication by spatially multiplexing using the same wireless channel, thereby making it possible to effectively use the wireless space resources is ongoing as a wireless system to which the MIMO transmission is applied (e.g., see Non-Patent Document 3). In the MU-MIMO, a wireless access point performs communication through spatial multiplexing by spatially separating data packets addressed to a plurality of wireless stations using beamforming, to thereby improve the throughput.

Here, the MU-MIMO transmission will be specifically described with reference to the drawings.

FIG. 22 is a block diagram showing a configuration of an MU-MIMO transmission system. The communication system shown in FIG. 22 is provided with an access point 1110 and stations 1111 and 1112 which perform wireless packet communication with the access point 1110. In addition, $H_1$ and $H_2$ represent propagation channels.

FIG. 23 is a time chart describing an operation of the MU-MIMO transmission. As shown in FIG. 23, in the MU-MIMO transmission, frames include a carrier sense (CS) which checks whether another wireless device is performing communication, a null data packet announcement (NDPA) which announces transmission of a null data packet, a null data packet (NDP) configured by null data, a beamforming report (BR) which notifies of propagation channel information estimated from the NDP, a beamforming report poll (BRP) which requests propagation channel information, data (Data1 and Data2) for the station 1111 and the station 1112, a block acknowledgement (BACK) which notifies of whether a signal has been accurately received, and a block acknowledgement request (BACKR) which requests the block ACK.

It is assumed that data (transmission target data) of a packet to be transmitted to the stations 1111 and 1112 have been generated in the access point 1110. Accordingly, the access point 1110 executes a carrier sense (CS) at random time intervals. As a result of the carrier sense, it is determined whether the state is an idle state in which a communication frequency band is not used or a busy state in which the communication frequency band is used.

For example, it is assumed that as a result of the carrier sense (CS) executed at time t101, the idle state, in which the communication frequency band is not used, have been detected. Accordingly, the access point 1110 generates and transmits an NDPA in a period from, for example, time t103 at which a certain time has elapsed from time t102 to time t104.

Next, the access point 1110 generates and transmits an NDP for estimating a propagation channel in a period from time t105 at which a certain time has elapsed from time t104 to time t106. In this case, the access point 1110 recognizes the stations 1111 and 1112 of destinations of the above transmission target data. Then, the access point 1110 designates the stations 1111 and 1112 as the destinations and transmits a signal for measurement.

In response to reception of the above signal for measurement, the stations 1111 and 1112 measure the performances of propagation channels within the same period from time t105 to time t106. Then, the stations 1111 and 1112 generate BRs including the performances of the propagation channels or information calculated from the performances of the propagation channels in a period from time t106 to time t107.

Next, the station 1111 transmits the BR in a period from time t107 at which a certain time has elapsed from time t106 to time t108.

Next, the access point 1110 generates and transmits a BRP which requests the station 1112 to transmit propagation channel information in a period from time t109 at which a certain time has elapsed from time t108 to time t110.

Next, the station 1112 transmits the BR in a period from time t111 at which a certain time has elapsed from time t110 to time t112 in response to reception of the above BRP.

Next, the access point 1110 calculates transmission weights and generates a transmission signal using the notified BRs. In addition, the access point 1110 transmits transmission target data in a period from time t113 at which a prescribed time has elapsed from time t112 to time t114. It is to be noted that the data to be transmitted in the period from time t113 to time t114 is, for example, converted into a frame suitable for wireless communication. In addition, when the frame aggregation has been applied, the data to be transmitted in the period from time t113 to time t114 is a data unit in which a predetermined number of frames are connected.

Then, in response to completion of reception of the data at time t114, the station 1111 transmits a BACK in a period from time t115 at which a certain time has elapsed from time t114 to time t116. The access point 1110 receives the BACK and executes a predetermined process corresponding to reception of the BACK. Specifically, for example, the access point 1110 determines that a receiving end has received the data normally by reason of reception of the BACK and transitions to a process of transmitting and receiving the next data. In addition, if timeout has been reached without receiving the BACK, the access point 1110 executes a process such as retransmission of the transmission target data.

Next, the access point 1110 generates and transmits a BACKR for requesting the station 1112 to transmit a BACK in a period from time t117 at which a certain time has elapsed from time t116 to time t118.

Next, the station 1112 transmits the BACK in a period from time t119 at which a certain time has elapsed from time t118 to time t120. The access point 1110 receives the BACK and executes a predetermined process corresponding to reception of the BACK.

In Non-Patent Document 3, MU-MIMO transmission is performed in accordance with the above time chart.

PRIOR ART DOCUMENTS

Non-Patent Documents

Non-Patent Document 1: Masahiro Morikura and Shuji Kubota, "Revised Third Edition 802.11 high-speed wireless LAN textbook," pp. 206, 242, and 243, impress R&D, Mar. 27, 2008.

Non-Patent Document 2: D. Gesbert, S. Hanly, H. Huang, S. Shitz, O. Simeone, and W. Yu, "Multi-cell MIMO cooperative networks: A new look at interference", IEEE Journal on Selected Areas in Communications, December 2010.

Non-Patent Document 3: IEEE P802.11ac/D1.0 Draft STANDARD for Information Technology-Telecommunications and information exchange between systems-Local and metropolitan area networks-Specific requirements Part 11: Wireless LAN Medium Access Control (MAC) and Physical Layer (PHY) specifications Amendment 5: Enhancements for Very High Throughput for Operation in Bands below 6 GHz, May 2011.

Non-Patent Document 4: IEEE P802.11n/D11.0 Draft STANDARD for Information Technology-Telecommunications and information exchange between systems-Local and metropolitan area networks-Specific requirements Part 11: Wireless LAN Medium Access Control (MAC) and Physical Layer (PHY) specifications Amendment 5: Enhancements for Higher Throughput, June 2009.

SUMMARY OF INVENTION

Problems to be Solved by the Invention

However, because directivity control is performed only on a data portion when the cooperative transmission using the interference suppression technology is performed using a plurality of wireless LAN transmitters shown in FIG. 21, there is a problem in that it is impossible to suppress interference of known signals (preamble signals and pilot subcarrier signals) on which the directivity control has not been performed and the throughput is not increased due to mutual signal interference. That is, in the configuration of the traditional wireless LAN transmitter, a weighting process is not performed on the preamble signals and the pilot subcarrier signals which are common signals. Thus, when the cooperative transmission using the interference suppression technology is performed, it is impossible to perform normal communication with the configuration of the traditional wireless LAN transmitter.

In addition, several times until a signal is transmitted after receiving the signal are prescribed in the wireless LAN. A shortest prescribed time is 16 p. For example, when the access point receives a signal from the station, it is necessary for the access point to first generate preamble signals within a prescribed time from a reception time and perform transmission after the prescribed time has elapsed.

Conventionally, it is possible to perform transmission within the prescribed time because the weighting process is not performed in generation of the preamble signals. In addition, even if the weighting process is performed, when the number of antennas of the access point and station is small, the computational complexity is small and therefore the transmission signal can be generated within the prescribed time. However, recently, in order to perform high-speed and high-capacity transmission, the number of antennas of the access point and the number of antennas of the station have been increased and the computational complexity of weighting has also been increased. In this case, there is a problem in that it is impossible to generate a transmission signal within a prescribed time.

In addition, in the above Non-Patent Document 3, it is necessary to use a plurality of stations 1111 and 1112 prescribed in the same standard as that of the access point 1110 as a condition that MU-MIMO transmission with the plurality of stations 1111 and 1112 can be performed using the access point 1110 prescribed in the standard described in Non-Patent Document 3. That is, when a station prescribed in an earlier standard than the standard of the access point is included in the plurality of stations 1111 and 1112, the MU-MIMO transmission is impossible. This is because pilot signals, which are known signals prescribed in the standards, interfere with each other. Hereinafter, this problem will be described with reference to the drawings.

FIG. 24 is a conceptual diagram showing a configuration of a wireless signal using a band of 20 MHz in an IEEE 802.11 ac standard described in Non-Patent Document 3. The wireless signal includes an L-STF (non-high throughput (HT) short training field), an L-LTF (non-HT long training field), an L-SIG (non-HT SIGNAL field), a VHT-SIG-A (very high throughput (VHT) SIGNAL-A field), a VHT-STF (VHT short training field), a VHT-LTF (VHT long training field), a VHT-SIG-B (VHT SIGNAL-B field), and Data.

Next, FIG. 25 is a conceptual diagram showing a configuration of a wireless signal using a band of 20 MHz in an IEEE 802.11n standard described in Non-Patent Document 4. The wireless signal includes an L-STF, an L-LTF, an L-SIG, a HT-SIG (HT SIGNAL field), an HT-STF (HT short training field), an HT-LTF (HT long training field), and Data.

For example, when there are a station (11ac station) capable of receiving a frame prescribed in FIG. 24 and a station (11n station) capable of receiving a frame prescribed in FIG. 25 and the access point 1110 has performed MU-MIMO transmission to both the 11n station and the 11 ac station (i.e., when the 11ac access point has performed spatial division multiplexing transmission simultaneously for the 11ac station and the 11n station), it is impossible for the 11n station to read the L-SIG, the HT-SIG, and the pilot signals due to interference by a signal from the 11ac station.

Likewise, it is impossible for the 11ac station to read the L-SIG, the VHT-SIG-A, and the pilot signals due to interference by a signal from the 11n station. This is because a configuration in which beamforming is not applied to the above signals in generation of the transmission signal is used. Therefore, the above signals for the 11n station and the 11 ac station interference with each other and the MU-MIMO transmission is difficult.

The present invention has been made in consideration of such circumstances and an object thereof is to provide a wireless signal transmitting method and a wireless apparatus capable of reducing interference in cooperative transmission using interference suppression technology.

In addition, an object of the present invention is to provide technology for enabling an access point to perform spatial multiplexing transmission using the same frequency at the same time for a station configured in the same standard as that of the access point and a station configured in an earlier standard.

Means for Solving the Problems

In order to solve the above problems, the present invention is a wireless signal transmitting method in which at least one access point transmits a wireless signal on which directivity control has been performed to stations, and the wireless signal transmitting method includes: a known signal generating step of generating a known signal to be added to the wireless signal; a weighting processing step of performing weighting on the known signal; and a wireless processing step of transmitting the known signal on which the weighting has been performed.

In the present invention, the at least one access point may be a plurality of access points each constituting a different communication cell, and the wireless signal transmitting method may further include: an extracting step of extracting a propagation channel corresponding to a subcarrier in which the known signal is transmitted from among propagation channels acquired from the stations; and a weighting processing for preamble signal step of calculating a weight based on the extracted propagation channel and performing the weighting on the known signal.

In the present invention, in the weighting processing for preamble signal step, a weighted known signal may be pre-calculated by multiplying the known signal by the weight calculated based on the propagation channel corresponding to the subcarrier in which the known signal is transmitted, and in the wireless processing step, the weighted known signal may be added to the wireless signal and transmitted.

The present invention may further include a storing step of storing the pre-calculated weighted known signal, and, in the wireless processing step, at a predetermined transmission timing, the weighted known signal stored in the storing step may be read, and the read weighted known signal may be added to the wireless signal and transmitted.

In the present invention, the at least one access point may be a single access point, and the wireless signal transmitting method may further include: a weight calculating step of calculating weight coefficients for part of subcarriers based on propagation channel information provided from a first receiving station configured in accordance with a first standard and a second receiving station configured in accordance with a second standard different from the first standard; and a weight interpolating step of calculating weight coefficients of the remaining subcarriers based on the weight coefficients for the part of the subcarriers, and in the weighting processing step, the weighting may be performed based on the weight coefficients calculated in the weight calculating step and the weight coefficients calculated in the weight interpolating step.

In the present invention, the at least one access point may be a single access point, in the weighting processing step, the weighting may be performed based on propagation channel information provided from a first receiving station configured in accordance with a first standard and a second receiving station configured in accordance with a second standard different from the first standard, and the wireless signal transmission method may further include: a common signal generating step of generating a common known signal based on the first standard; and a common signal transmitting step of transmitting the common known signal.

The present invention may further include a response signal transmitting step of first transmitting a response signal from a receiving station configured in accordance with an older standard between the first receiving station and the second receiving station.

The present invention is a wireless apparatus which transmits a wireless signal on which directivity control has been performed to stations in a wireless system including at least one wireless apparatus, and the wireless apparatus includes: a known signal generating unit which generates a known signal to be added to the wireless signal; a weighting processing unit which performs weighting on the known signal generated by the known signal generating unit; and a wireless processing unit which transmits the known signal on which the weighting has been performed by the weighting processing unit.

In the present invention, the at least one wireless apparatus may be a plurality of wireless apparatuses each constituting a different communication cell, and the wireless apparatus may further include: an extracting unit which extracts a propagation channel corresponding to a subcarrier in which the known signal is transmitted from among propagation channels acquired from the stations; and a weighting processing unit for preamble signal which calculates a weight based on the propagation channel extracted by the extracting unit and performs the weighting on the known signal using the weight.

In the present invention, the weighting processing unit for preamble signal may pre-calculate a weighted known signal by multiplying the known signal by the weight calculated based on the propagation channel corresponding to the subcarrier in which the known signal is transmitted, and the wireless processing unit may add the weighted known signal to the wireless signal and performs transmission.

The present invention, may further include a preamble storing unit which stores the weighted known signal pre-calculated by the weighting processing unit for preamble signal, and, at a predetermined transmission timing, the wireless processing unit may read the weighted known signal stored in the preamble storing unit, add the read weighted known signal to the wireless signal, and perform transmission.

In the present invention, the at least one wireless apparatus may be a single wireless apparatus, and the wireless apparatus may further include: a weight calculating unit which calculates weight coefficients for part of subcarriers based on propagation channel information provided from a first receiving station configured in accordance with a first standard and a second receiving station configured in accordance with a second standard different from the first standard; and a weight interpolating unit which calculates weight coefficients of the remaining subcarriers based on the weight coefficients for the part of the subcarriers, and the weighting processing unit may perform the weighting based on the weight coefficients calculated by the weight calculating unit and the weight coefficients calculated by the weight interpolating unit.

In the present invention, the at least one wireless apparatus may be a single wireless apparatus, the weighting processing unit may perform the weighting based on propagation channel information provided from a first receiving station configured in accordance with a first standard and a second receiving station configured in accordance with a second standard different from the first standard, and the wireless apparatus may further include: a common signal generating unit which generates a common known signal based on the first standard; and a common signal transmitting unit which transmits the common known signal.

Advantageous Effects of Invention

In accordance with the present invention, it is possible to reduce interference in cooperative transmission using interference suppression technology.

In addition, in accordance with the present invention, an access point can perform spatial multiplexing transmission using the same frequency at the same time for a station configured in the same standard as that of the access point and a station configured in an earlier standard.

MODES FOR CARRYING OUT THE INVENTION

Hereinafter, embodiments of the present invention will be described with reference to the drawings.

First, before first to third embodiments of the present invention are described, a method for generating transmission weights in cooperative transmission using interference suppression technology will be specifically described.

Figure 1:
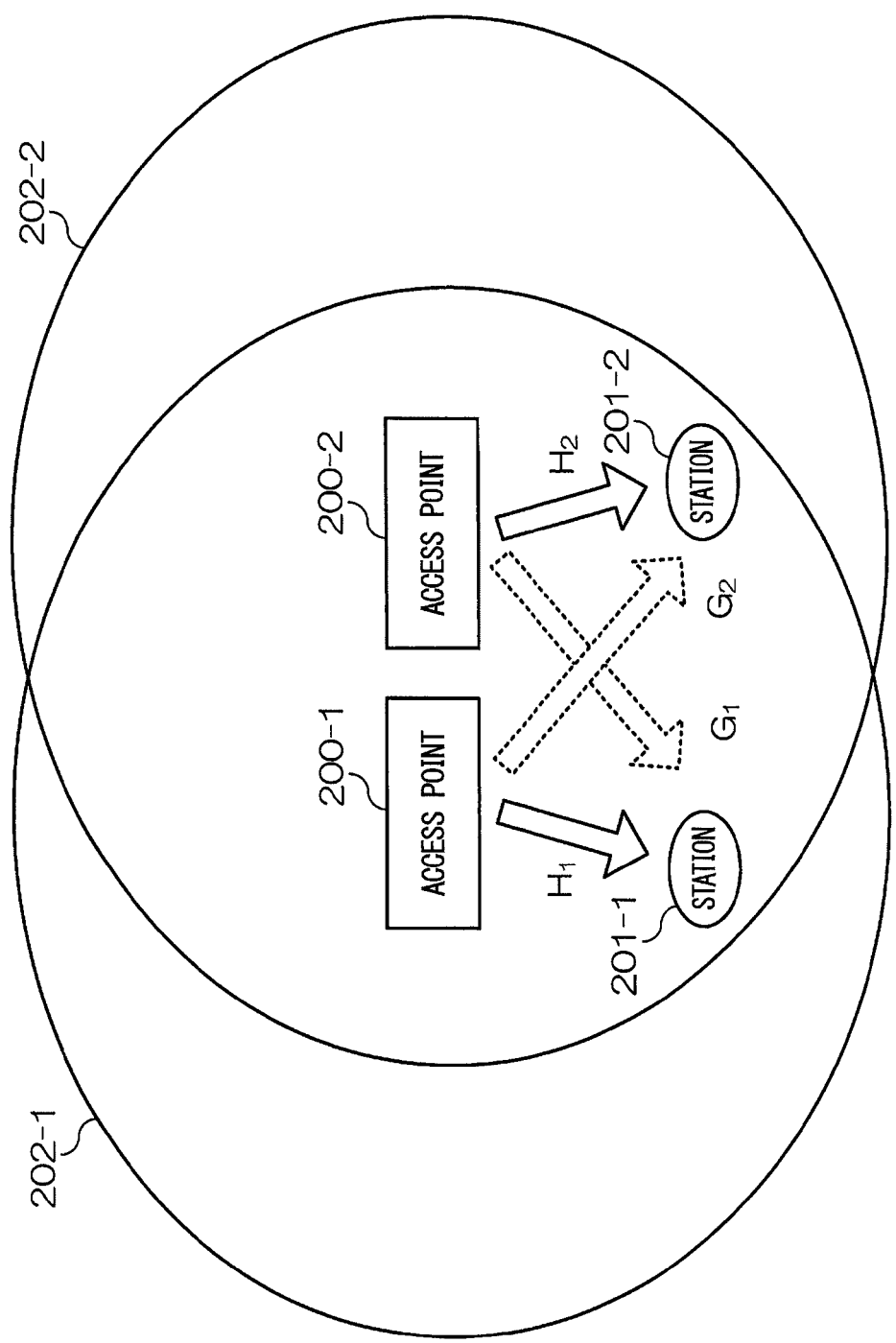
FIG. 1 is a conceptual diagram describing cooperative transmission using interference suppression technology assumed in first to third embodiments of the present invention.

FIG. 1 is a conceptual diagram describing the cooperative transmission using the interference suppression technology assumed in the first to third embodiments of the present invention. As shown in FIG. 1, a wireless system includes two access points 200-1 and 200-2, a station 201-1 which performs wireless packet communication with the access point 200-1, and a station 201-2 which performs wireless packet communication with the access point 200-2. The station 201-1 belongs to a communication cell 202-1 to be controlled by the access point 200-1 and communicates with an external network (not shown) via the access point 200-1. In addition, the station 201-2 belongs to a communication cell 202-2 to be controlled by the access point 200-2 and communicates with the external network via the access point 200-2.

The access points 200-1 and 200-2 and the stations 201-1 and 201-2 perform wireless packet communication using a carrier sense multiple access/collision avoidance (CSMA/CA) scheme. In addition, the wireless packet communication in the two communication cells 202-1 and 202-2 is performed using the same frequency channels. In the wireless packet communication, identifiers representing a transmitting device and a destination device are included in a wireless packet to be transmitted and received. Here, the transmitting device is an apparatus generating and transmitting the wireless packet, and the destination device is an apparatus serving as a destination of the wireless packet.

In addition, because there is a region in which the communication cells 202-1 and 202-2 overlap with each other in FIG. 1 and wireless packet communications are interfered with each other in this region, communication bands of frequency channels are proportionally divided and used by the communication cells 202-1 and 202-2.

In addition, as shown in FIG. 1, a propagation channel between the access point 200-1 and the station 201-1, a propagation channel between the access point 200-2 and the station 201-2, a propagation channel between the access point 200-2 and the station 201-1, and a propagation channel between the access point 200-1 and the station 201-2 are denoted as $H_1$, $H_2$, $G_1$, and $G_2$, respectively. For example, the number of antennas of the access point is assumed to be 2N and the number of antennas of the station is assumed to be N.

The propagation channel $G_1$ or $G_2$ between each access point and the nearby communication cell can be represented as in Equation (1) by performing singular value decomposition. It is to be noted that because similar calculations are possible for the access points 200-1 and 200-2, only a calculation method for the access point 200-1 will be shown below.

[Equation 1]

$$G_2 = U\Sigma V^H$$

$$U=[u_1 \ldots u_N]$$

$$\Sigma=[\text{diag}(\sqrt{\lambda_1} \ldots \sqrt{\lambda_N})0]$$

$$V=[v_1 \ldots v_{2N}] \quad (1)$$

Here, U is a left singular value matrix, $\Sigma$ is a diagonal matrix having square roots of eigenvalues as diagonal elements, and V is a right singular value matrix. Next, Equations (2) are derived from part of V and $H_1$.

[Equation 2]

$$H_1[v_{N+1} \ldots v_{2N}]=U'\Sigma'V'^H$$

$$U'=[u_1' \ldots u_N']$$

$$\Sigma'=[(\text{diag}(\sqrt{\lambda_1'} \ldots \sqrt{\lambda_N'})0]$$

$$V'=[v_1' \ldots v_N'] \quad (2)$$

In this example, a transmission weight W is represented as shown in Equation (3).

[Equation 3]

$$W=V'[v_{N+1} \ldots v_{2N}] \quad (3)$$

The transmission weight W is derived using the above method.

First Embodiment

First, the first embodiment of the present invention will be described.

[Configuration of Access Point]

Figure 2:
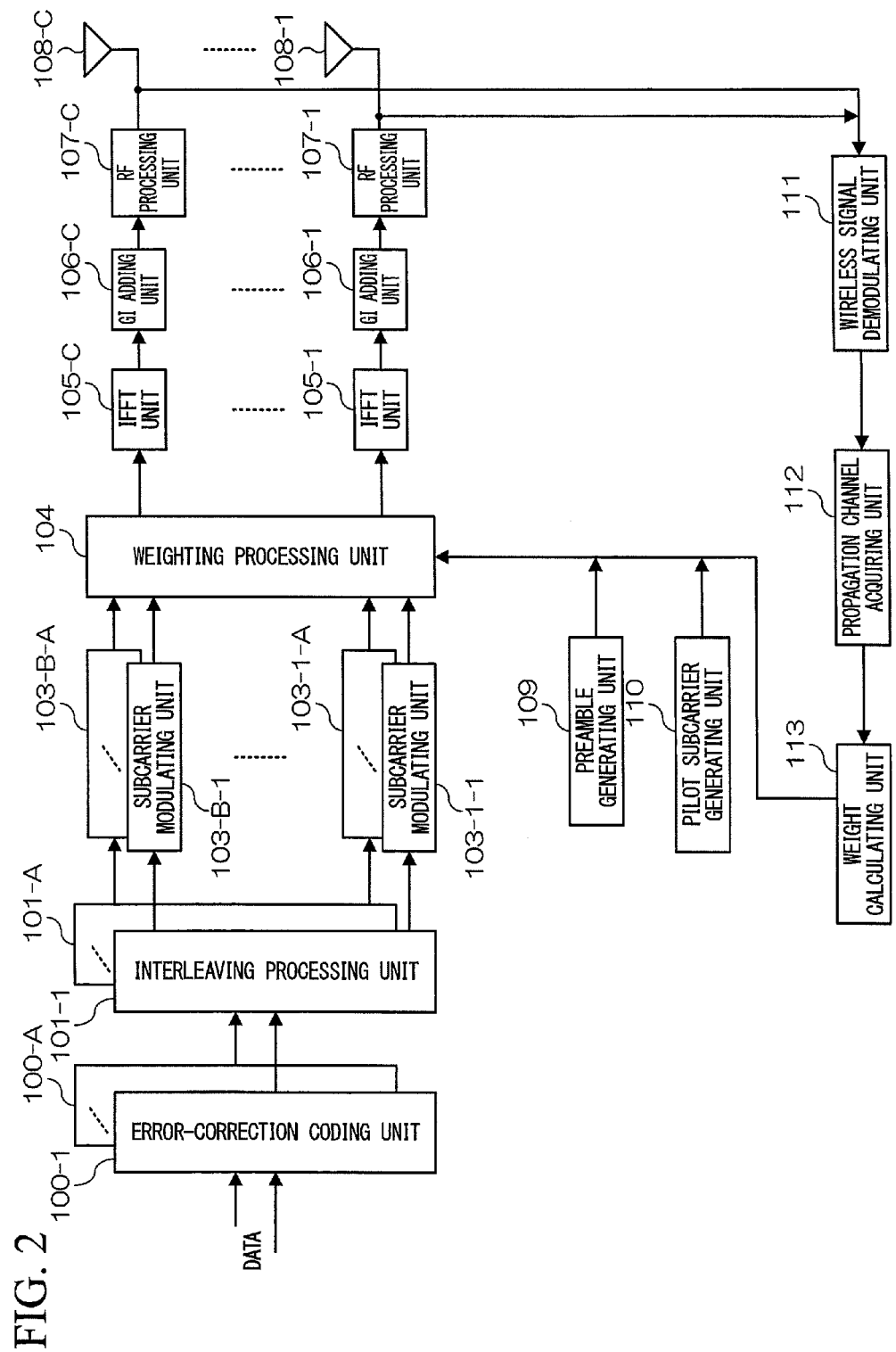
FIG. 2 is a block diagram showing a schematic configuration of access points 200-1 and 200-2 in the first embodiment of the present invention.

FIG. 2 is a block diagram showing a schematic configuration of the access points 200-1 and 200-2 in the present first embodiment. As shown in FIG. 2, the access points 200-1 and 200-2 each include error-correction coding units 100-1 to 100-A, interleaving processing units 101-1 to 101-A, subcarrier modulating unit 103-1-1 to 103-B-A, a weighting processing unit 104, IFFT units 105-1 to 105-C, GI adding units 106-1 to 106-C, RF processing units 107-1 to 107-1C, antennas 108-1 to 108-C, a preamble generating unit 109, a pilot subcarrier generating unit 110, a wireless signal demodulating unit 111, a propagation channel acquiring unit 112, and a weight calculating unit 113.

Figure 21:
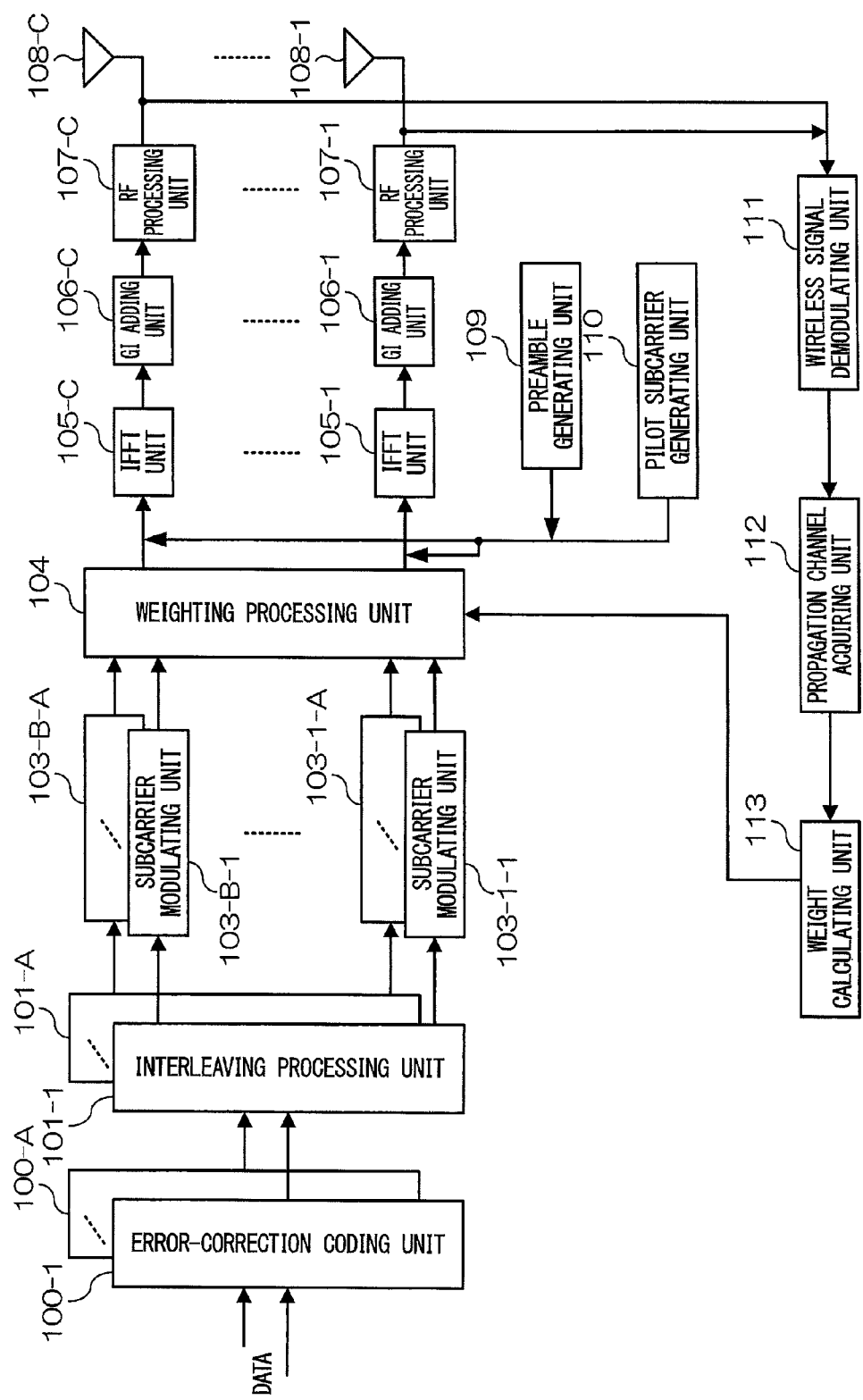
FIG. 21 is a block diagram showing a configuration of a general wireless LAN transmitter capable of performing transmission beamforming.
Figure 22:
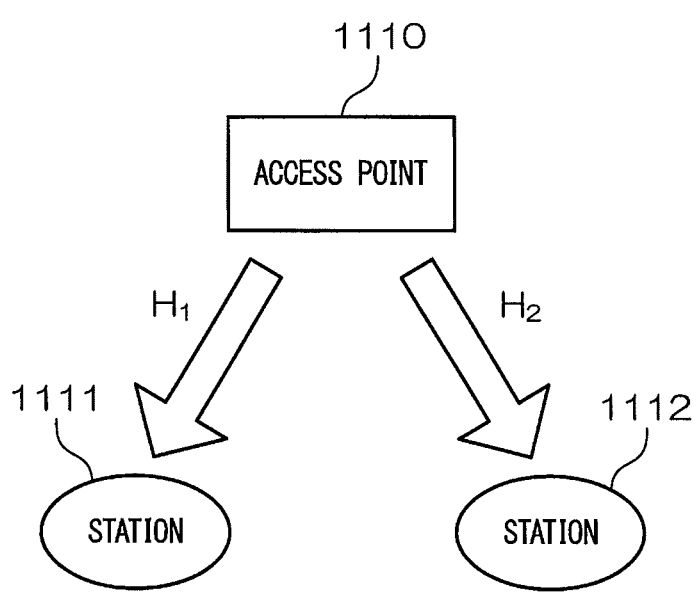
FIG. 22 is a block diagram showing a configuration of an MU-MIMO transmission system.
Figure 23:
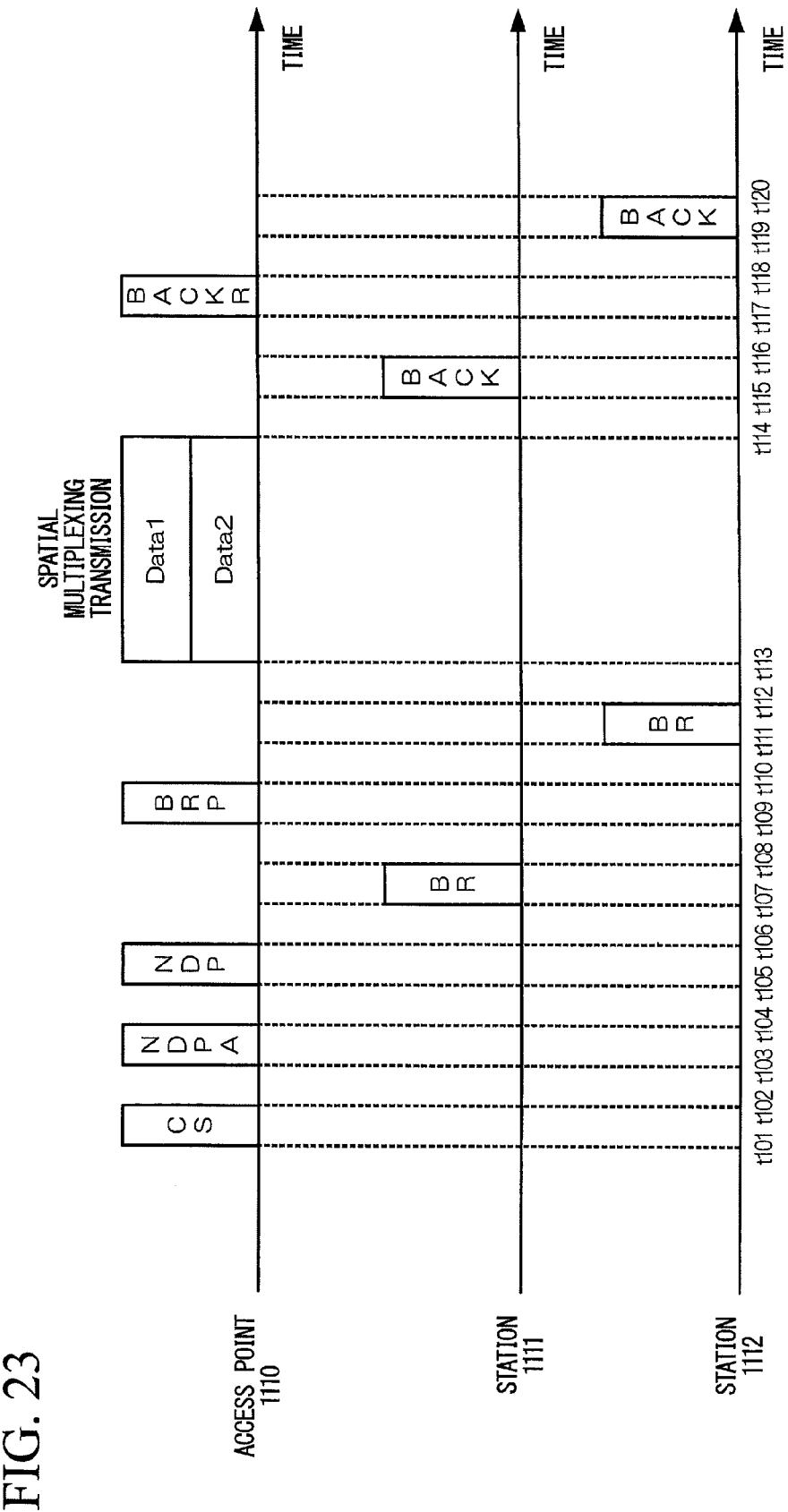
FIG. 23 is a time chart describing an operation of MU-MIMO transmission.

It is to be noted that because the error-correction coding units 100-1 to 100-A, the interleaving processing units 101-1 to 101-A, the subcarrier modulating units 103-1-1 to 103-B-A, the weighting processing unit 104, the IFFT units 105-1 to 105-C, the GI adding units 106-1 to 106-C, the RF processing units 107-1 to 107-C, the antennas 108-1 to 108-C, the preamble generating unit 109, the pilot subcarrier generating unit 110, the wireless signal demodulating unit 111, the propagation channel acquiring unit 112, and the weight calculating unit 113 have functions similar to those of the corresponding structural components shown in FIG. 21, a description thereof is omitted.

The difference between the configuration of the access points in the first embodiment shown in FIG. 2 and the configuration of the general wireless LAN transmitter shown in FIG. 21 is output destinations of preamble signals and pilot subcarrier signals. In FIG. 2, it is possible to perform the weighting process on the preamble signals and the pilot subcarrier signals by designating the output destinations of the preamble signals from the preamble generating unit 109 and the pilot subcarrier signals from the pilot subcarrier generating unit 110 as the weighting processing unit 104.

It is to be noted that the above preamble generating unit 109 and the pilot subcarrier generating unit 110 correspond to a known signal generating unit in the claims. In addition, the above preamble signals and pilot subcarrier signals correspond to known signals in the claims. In addition, the RF processing units 107-1 to 107-1C correspond to a wireless processing unit in the claims.

[Configuration of Station]

Next, the configuration of the stations 201-1 and 201-2 will be described.

Figure 3:
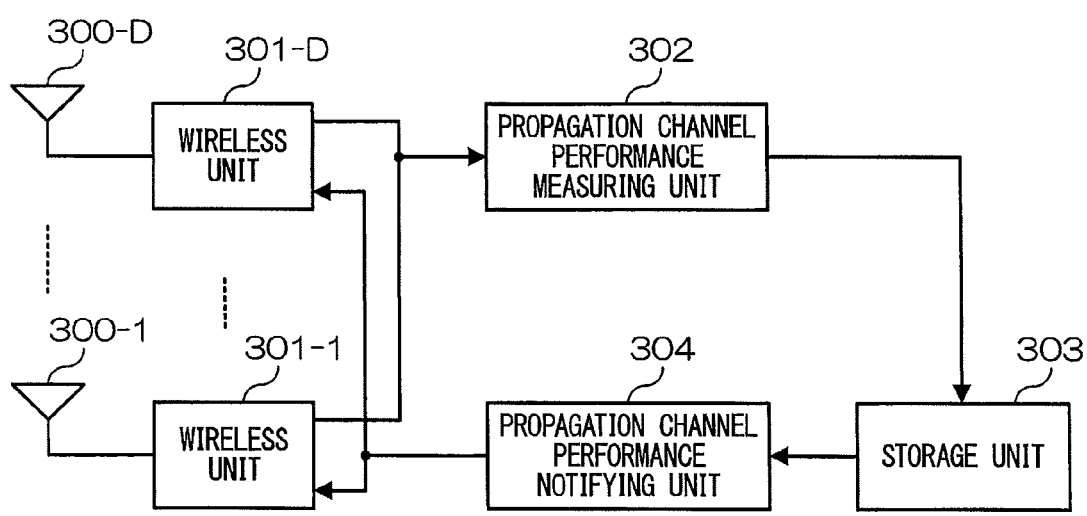
FIG. 3 is a block diagram showing a schematic configuration of stations 201-1 and 201-2 in the first embodiment of the present invention.

FIG. 3 is a block diagram showing a schematic configuration of the stations 201-1 and 201-2 in the present first embodiment. As shown in FIG. 3, the stations 201-1 and 201-2 each include antennas 300-1 to 300-D, wireless units 301-1 to 301-D, a propagation channel performance measuring unit 302, a storage unit 303, and a propagation channel performance notifying unit 304.

The antennas 300-1 to 300-D radiate wireless signals into air. Each of the wireless units 300-1 to 301-D inputs data and a signal to be transmitted and generate a transmission signal by performing framing, a predetermined modulation process, and the like. In addition, each of the wireless units 301-1 to 301-D inputs a received signal and executes a predetermined demodulation process and the like. The propagation channel performance measuring unit 302 measures a propagation channel using a preamble signal in a wireless signal transmitted from an access point. The storage unit 303 stores the propagation channel measured by the propagation channel performance measuring unit 302. The propagation channel performance notifying unit 304 generates a wireless signal in which the stored propagation channel is included in a data portion.

[Example of Communication Procedure Among Access Points and Stations]

Figure 4:
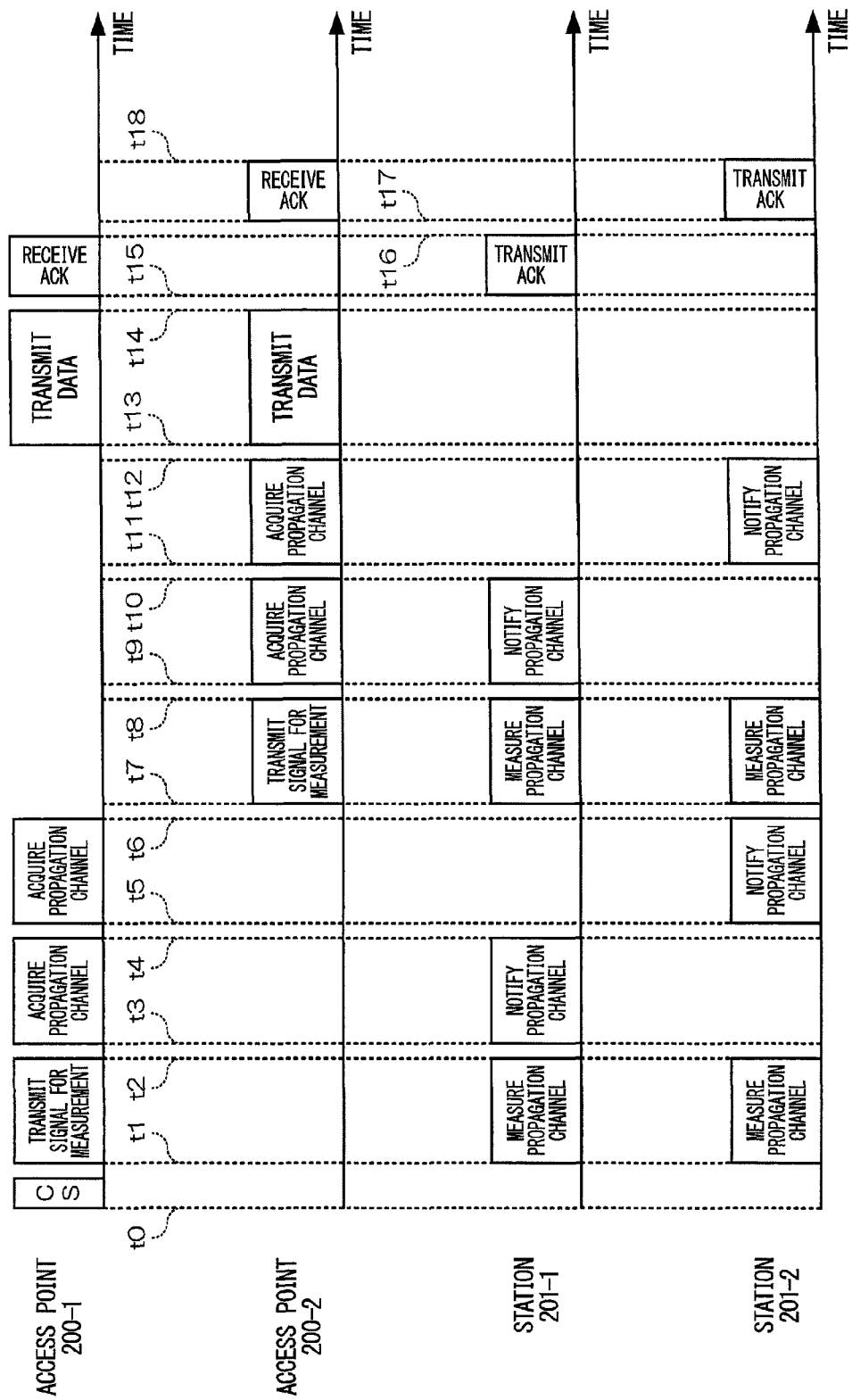
FIG. 4 is a timing chart showing an example of a communication procedure among the access point 200-1 and 200-2 and the stations 201-1 and 201-2 in the first embodiment of the present invention.

FIG. 4 is a timing chart showing an example of a communication procedure among the access points 200-1 and 200-2 and the stations 201-1 and 201-2 in the present first embodiment. It is to be noted that the description of FIG. 4 assumes that CSMA/CA is adopted as an access control scheme.

In the access points 200-1 and 200-2, data of a packet (transmission target data) to be transmitted to the stations 201-1 and 201-2 is assumed to have been generated. Accordingly, the access point 200-1 executes a carrier sense (CS) at random time intervals. As a result of the carrier sense, it is determined whether the state is an idle state in which a communication frequency band is not used or a busy state in which the communication frequency band is used.

For example, as a result of the carrier sense executed at time t0 shown in FIG. 4, the idle state, in which the communication frequency band is not used, is assumed to have been detected. Accordingly, the access point 200-1 generates and transmits a signal for measurement for estimation of propagation channels in a period from, for example, time t1 at which a certain time has elapsed from time t0 to time t2. In this case, the access point 200-1 recognizes the stations 201-1 and 201-2 which are destinations of the above transmission target data. Then, the access point 200-1 designates the stations 201-1 and 201-2 as the destinations and transmits the signal for measurement.

In response to reception of the above signal for measurement, the stations 201-1 and 201-2 measure the performances of propagation channels within the same period from time t1 to time t2. Then, the station 201-1 generates and transmits a propagation channel notification signal including the performance of the propagation channel in a period from time t3 at which a certain time has elapsed from time t2 to time t4. In addition, the station 201-2 generates and transmits a propagation channel notification signal including the performance of the propagation channel in a period from time t5 at which a predetermined time has elapsed from time t4 to time t6.

In response to reception of the propagation channel notification signals after time t3, the access point 200-1 calculates a transmission weight for each subcarrier using the acquired propagation channels and generates a transmission signal using the calculated transmission weights.

Likewise, the access point 200-2 generates and transmits a signal for measurement for estimation of propagation channels in a period from time t7 at which a predetermined time has elapsed from time t6 to time t8. In this case, the access point 200-2 recognizes the stations 201-1 and 201-2 which are destinations of the above transmission target data. Then, the access point 200-2 designates the stations 201-1 and 201-2 as the destinations and transmits the signal for measurement.

In response to reception of the above signal for measurement, the stations 201-1 and 201-2 measure the performances of propagation channels within the same period from time t7 to time t8. Then, the station 201-1 generates and transmits a propagation channel notification signal including the performance of the propagation channel in a period from time t9 at which a predetermined time has elapsed from time t8 to time t10. In addition, the station 201-2 generates and transmits a propagation channel notification signal including the performance of the propagation channel in a period from time t11 at which a predetermined time has elapsed from time t10 to time t12.

In response to reception of the propagation channel notification signals after time t9, the access point 200-2 calculates a transmission weight for each subcarrier using the acquired propagation channels and generates a transmission signal using the calculated transmission weights.

Next, the access points 200-1 and 200-2 transmit transmission target data in a period from time t13 at which a prescribed time has elapsed from time t12 to time t14. Here, the prescribed time is a prescribed time prescribed in a wireless LAN standard. For example, it is 16 μs of a short inter frame space (SIFS). It is to be noted that the data to be transmitted in the period from time t13 to time t14 is, for example, converted into a frame suitable for wireless communication. In addition, when frame aggregation has been applied, the data to be transmitted in the period from time t13 to time t14 is a data unit in which a predetermined number of frames are connected.

Then, in response to completion of reception of the data at time t14, the station 201-1 transmits an ACK in a period from time t15 at which a certain time has elapsed from time t14 to time t16. The access point 200-1 receives the ACK and executes a predetermined process corresponding to reception of the ACK. Specifically, for example, the access point 200-1 determines that a receiving end has received the data normally by reason of the reception of the ACK and transitions to a process of transmitting and receiving the next data. Alternatively, if timeout has been reached without receiving the ACK, the access point 200-1 executes a process such as retransmission of the transmission target data. Alternatively, when the transmission data is obtained by connecting a plurality of frames in accordance with frame aggregation, a frame ACK is returned. In this case, the access point 200-1 retransmits a frame which has caused a reception error based on a reception result of the frame indicated by the frame ACK.

Likewise, the station 201-2 transmits an ACK in a period from time t17 at which a certain time has elapsed from time t16 to time t18. The access point 200-2 receives the ACK and executes a predetermined process corresponding to reception of the ACK.

As described above, in the present first embodiment, every time transmission target data is generated, transmission and reception of the data are performed among the access points 200-1 and 200-2 and the stations 201-1 and 201-2 in accordance with the above procedure from time t0 to time t18.

[Example of Signal Generation Processing Procedure]

Figure 5:
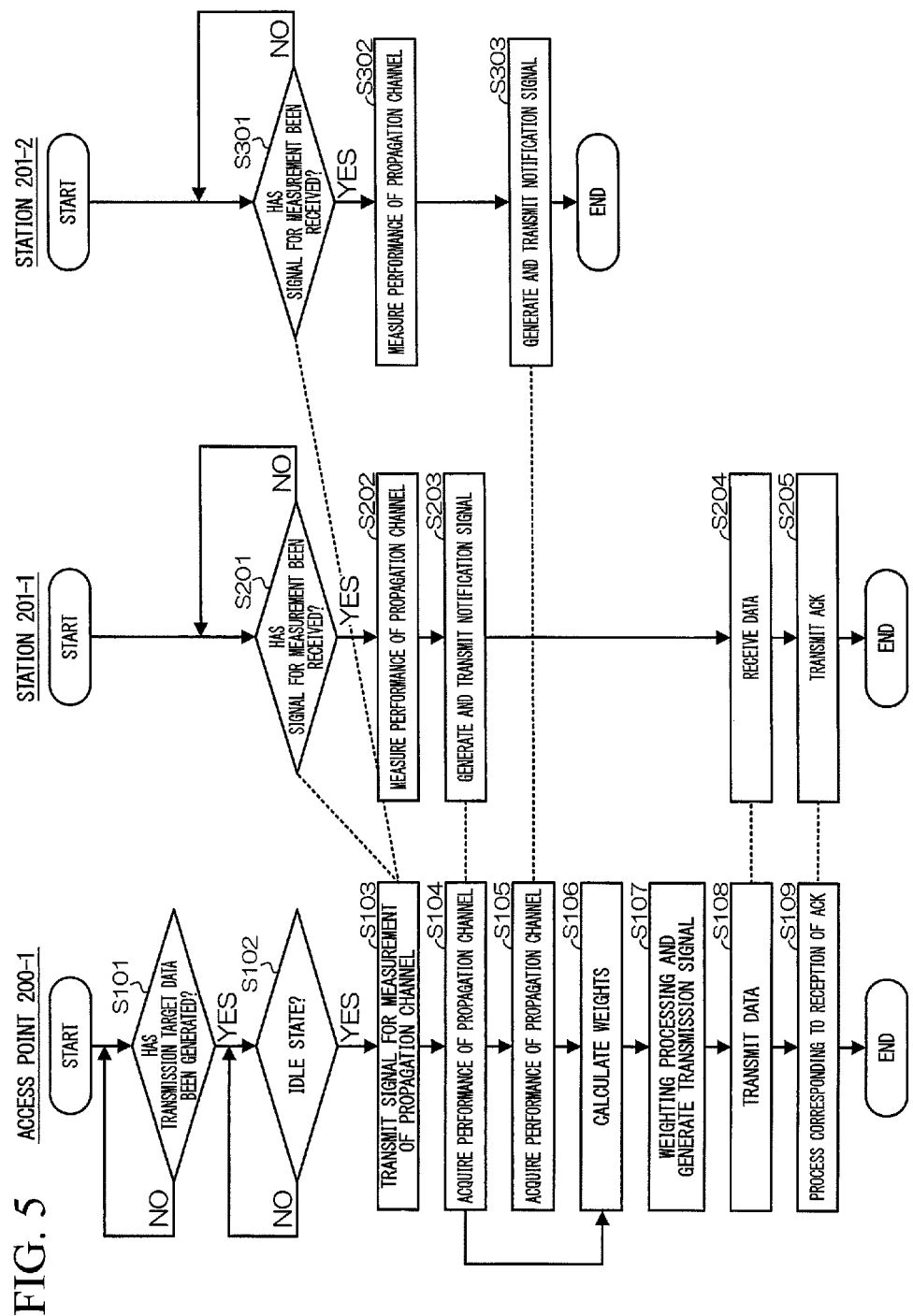
FIG. 5 is a flowchart describing a communication procedure among the access point 200-1 and the stations 201-1 and 201-2 in the first embodiment of the present invention.

FIG. 5 is a flowchart describing a communication procedure among the access point 200-1 and the stations 201-1 and 201-2 in the present first embodiment. It is to be noted that because the signal generation processing procedure of the access point 200-2 is similar to that of the access point 200-1, a description thereof is omitted. The process of the access point 200-1 shown in FIG. 5 can be considered as being appropriately executed by some of the functional units shown in FIG. 2. In addition, the processes of the stations 201-1 and 201-2 shown in FIG. 5 can be considered as being appropriately executed by some of the functional units shown in FIG. 3.

The access point 200-1 determines whether transmission target data has been generated (step S101) and waits for the transmission target data to be generated if the transmission target data has not been generated (NO of step S101). Then, if the transmission target data has been generated (YES of step S101), the access point 200-1 executes a carrier sense to determine whether the idle state has been detected (step S102). Then, if the idle state has not been detected (NO of step S102), the access point 200-1 waits until the idle state is detected.

Then, if a carrier sense is executed and the idle state is detected (YES of step S102), the access point 200-1 generates a signal for measurement of propagation channels and transmits the signal for measurement of propagation channels with the stations 201-1 and 201-2 designated as the same destinations as those of the above transmission target data (step S103).

The station 201-1 determines whether the signal for measurement has been received (step S201) and waits until the signal for measurement is received if the signal for measurement has not been received (NO of step S201). In contrast, if the signal for measurement is received (YES of step S201), the propagation channel performance measuring unit 302 measures the performance of a propagation channel in response to the transmission of the signal for measurement and stores the performance of the propagation channel serving as a measurement result in the storage unit 303 (step S202). Next, the propagation channel performance notifying unit 304 generates a notification signal used to notify of the performance of the propagation channel stored in the storage unit 303 and transmits it to the access point 200-1 (step S203).

Likewise, the station 201-2 also determines whether the signal for measurement has been received (step S301) and waits until the signal for measurement is received if the signal for measurement has not been received (NO of step S301). In contrast, if the signal for measurement is received (YES of step S301), the propagation channel performance measuring unit 302 measures the performance of a propagation channel in response to the transmission of the signal for measurement and stores the performance of the propagation channel serving as a measurement result in the storage unit 303 (step S302). Next, the propagation channel performance notifying unit 304 generates a notification signal used to notify of the performance of the propagation channel stored in the storage unit 303 and transmits it to the access point 200-1 (step S303).

Accordingly, in the access point 200-1, the propagation channel acquiring unit 112 acquires the performance of the propagation channel from the notification signal received from the station 201-1 (step S104) and similarly acquires the performance of the propagation channel from the notification signal received from the station 201-2 (step S105). Next, the weight calculating unit 113 calculates a transmission weight for each subcarrier using the acquired propagation channels (step S106).

Next, in the access point 200-1, the weighting processing unit 104 performs a weighting process on preamble signals generated by the preamble generating unit 109 and on pilot subcarrier signals generated by the pilot subcarrier generating unit 110 using the calculated transmission weight for each subcarrier, and generates a weighted data signal (step S107). Next, the access point 200-1 transmits the weighted data signal a prescribed time after the notification signal transmitted from the station 201-2 has been received (step S108).

Accordingly, in the station 201-1, the wireless units 301-1 to 301-D receive the data signal transmitted from the access point 200-1 (step S204). Then, when reception of the data ends, the station 201-1 transmits an ACK to the access point 200-1 (step S205).

The access point 200-1 executes a predetermined process corresponding to reception of the ACK, which has been transmitted from the station 201-1 in response to completion of the transmission of the data signal (step S109).

In accordance with the above-described first embodiment, it is possible to avoid interference in the preamble signals and the pilot signals and increase the throughput by performing the weighting process on the preamble signals and the pilot subcarrier signals generated by the preamble generating unit 109 and the pilot subcarrier generating unit 110.

Second Embodiment

Figure 6:
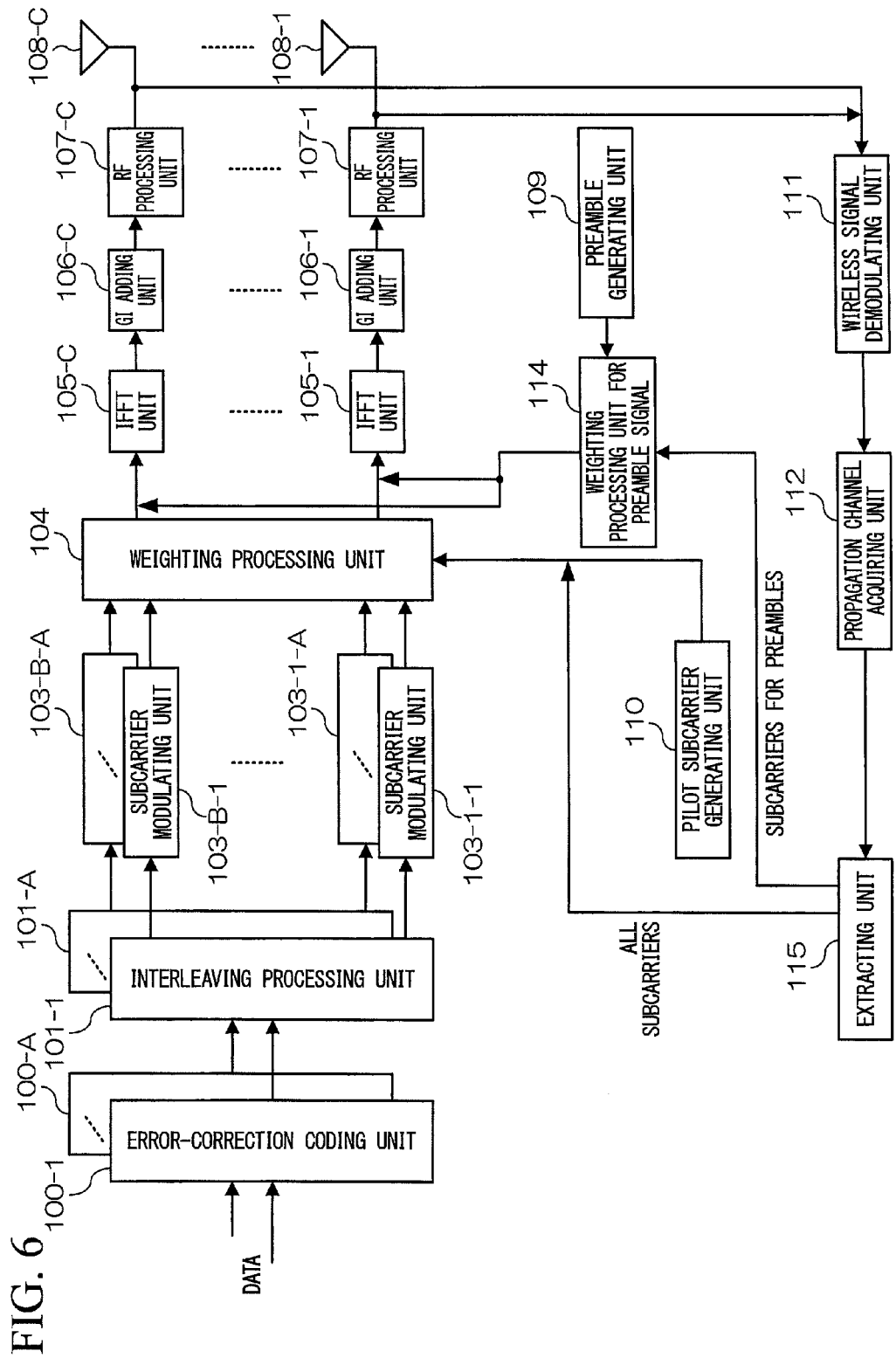
FIG. 6 is a block diagram showing a schematic configuration of the access points 200-1 and 200-2 in the second embodiment of the present invention.

Next, the second embodiment of the present invention will be described.
[Configuration of Access Point]
FIG. 6 is a block diagram showing a schematic configuration of the access points 200-1 and 200-2 in the second embodiment of the present invention. As shown in FIG. 6, the access points 200-1 and 200-2 each include error-correction coding units 100-1 to 100-A, interleaving processing units 101-1 to 101-A, subcarrier modulating units 103-1-1 to 103-B-A, a weighting processing unit 104, IFFT units 105-1 to 105-C, GI adding units 106-1 to 106-C, RF processing units 107-1 to 107-C, antennas 108-1 to 108-C, a preamble generating unit 109, a pilot subcarrier generating unit 110, a wireless signal demodulating unit 111, a propagation channel acquiring unit 112, a weighting processing unit for preamble signal 114, and an extracting unit 115.

It is to be noted that because the error-correction coding units 100-1 to 100-A, the interleaving processing units 101-1 to 101-A, the subcarrier modulating units 103-1-1 to 103-B-A, the weighting processing unit 104, the IFFT units 105-1 to 105-C, the GI adding units 106-1 to 106-C, the RF processing units 107-1 to 107-C, the antennas 108-1 to 108-C, the preamble generating unit 109, the pilot subcarrier generating unit 110, the wireless signal demodulating unit 111, and the propagation channel acquiring unit 112 have functions similar to those of the corresponding structural components shown in FIG. 21, a description thereof is omitted.

In the present second embodiment, the processing time of a weighting process is reduced using the fact that preamble signals are not arranged in all subcarriers and the preamble signals are transmitted in only specific subcarriers.

The extracting unit 115 extracts propagation channels corresponding to subcarriers used in preamble signals from among acquired propagation channels and outputs them to the weighting processing unit for preamble signal 114. In addition, the propagation channels corresponding to all the subcarriers are output to the weighting processing unit 104. The weighting processing unit for preamble signal 114 calculates weights based on the propagation channels corresponding to the subcarriers for the preamble signals input from the extracting unit 115, and performs the weighting process on the preamble signals.

Figure 7:
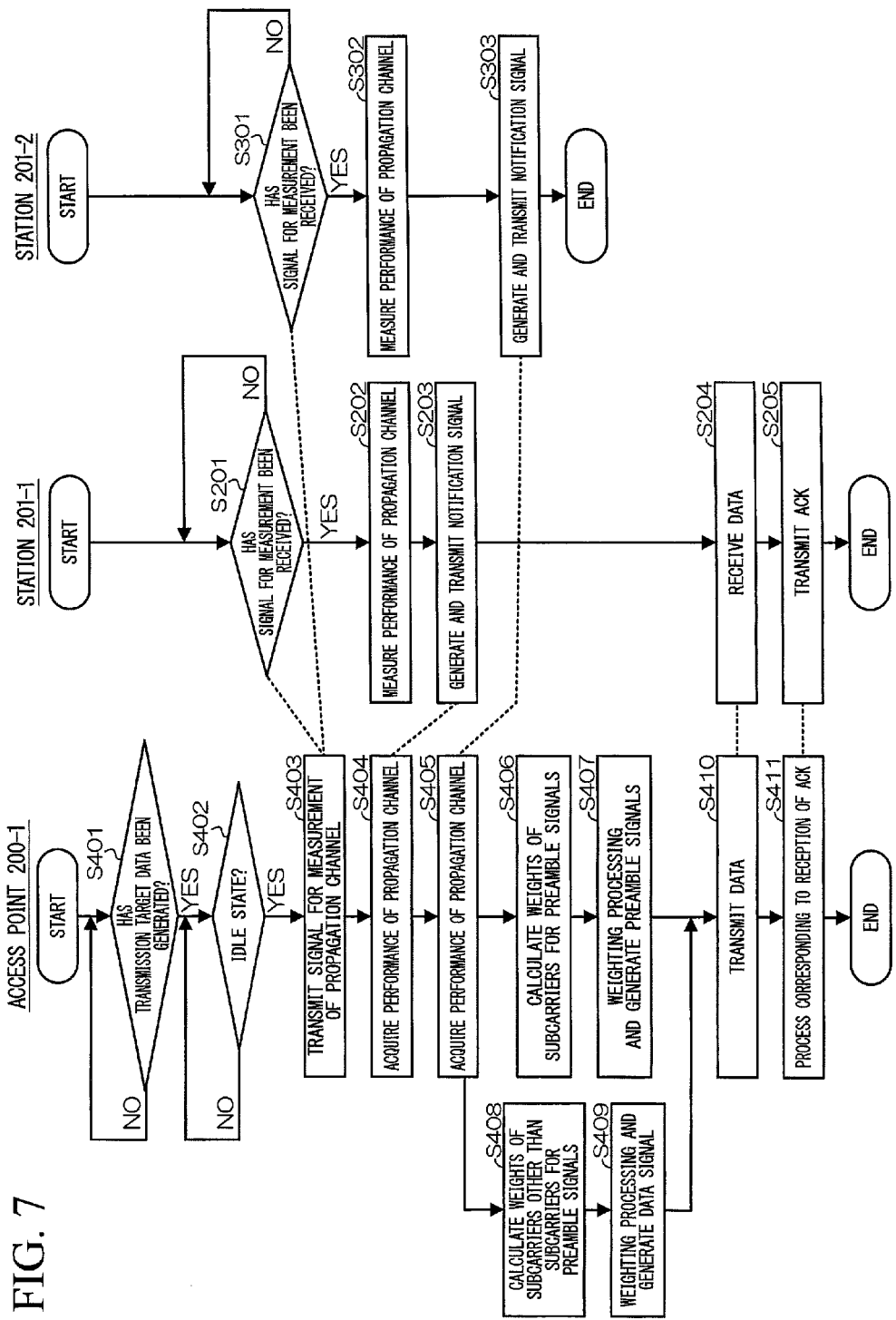
FIG. 7 is a flowchart describing a communication procedure among the access point 200-1 and the stations 201-1 and 201-2 in the second embodiment of the present invention.

In this manner, the weights are calculated for only the propagation channels corresponding to the subcarriers in which the preamble signals are transmitted, and thus the processing time can be shortened and the weighting process can be performed also on the preamble signals transmitted in the head of a wireless packet.
[Configuration of Station]
Because the configurations of the stations 201-1 and 201-2 in the present second embodiment are similar to that of FIG. 3, a description thereof is omitted.
[Example of Communication Procedure Among Access Points and Stations]
Because the timing chart in the present second embodiment is similar to that of FIG. 4, a description thereof is omitted.
[Example of Signal Generation Processing Procedure]
FIG. 7 is a flowchart describing a communication procedure among the access point 200-1 and the stations 201-1 and 201-2 in the present second embodiment. It is to be noted that because the signal generation processing procedure of the access point 200-2 is similar to that of the access point 200-1, a description thereof is omitted. The process of the access point 200-1 shown in FIG. 7 can be considered as being appropriately executed by some of the functional units shown in FIG. 6. In addition, the processes of the stations 201-1 and 201-2 shown in FIG. 7 can be considered as being appropriately executed by some of the functional units shown in FIG. 3.

The access point 200-1 determines whether transmission target data has been generated (step S401) and waits for the transmission target data to be generated if the transmission target data is not generated (NO of step S401). Then, if the transmission target data has been generated (YES of step S401), the access point 200-1 executes a carrier sense and determines whether the idle state has been detected (step S402). Then, if the idle state has not been detected (NO of step S402), the access point 200-1 waits until the idle state is detected.

In contrast, if a carrier sense is executed and the idle state is detected (YES of step S402), the access point 200-1 generates a signal for measurement of propagation channels and transmits the signal for measurement of propagation channels with the stations 201-1 and 201-2 designated as the same destinations as those of the above transmission target data (step S403).

The station 201-1 determines whether the signal for measurement has been received (step S201) and waits until the signal for measurement is received if the signal for measurement has not been received (NO of step S201). In contrast, if the signal for measurement is received (YES of step S201), the propagation channel performance measuring unit 302 measures the performance of a propagation channel in response to the transmission of the signal for measurement and stores the performance of the propagation channel serving as a measurement result in the storage unit 303 (step S202). Next, the propagation channel performance notifying unit 304 generates a notification signal used to notify of the performance of the propagation channel stored in the storage unit 303 and transmits it to the access point 200-1 (step S203).

Likewise, the station 201-2 also determines whether the signal for measurement has been received (step S301) and waits until the signal for measurement is received if the signal for measurement has not been received (NO of step S301). In contrast, if the signal for measurement is received (YES of step S301), the propagation channel performance measuring unit 302 measures the performance of a propagation channel in response to the transmission of the signal for measurement and stores the performance of the propagation channel serving as a measurement result in the storage unit 303 (step S302). Next, the propagation channel performance notifying unit 304 generates a notification signal used to notify of the performance of the propagation channel stored in the storage unit 303 and transmits it to the access point 200-1 (step S303).

Accordingly, in the access point 200-1, the propagation channel acquiring unit 112 acquires the performance of the propagation channel from the notification signal received from the station 201-1 (step S404) and similarly acquires the performance of the propagation channel from the notification signal received from the station 201-2 (step S405).

Next, in the access point 200-1, the extracting unit 115 extracts propagation channels corresponding to subcarriers to be used for preamble signals and the weighting processing unit for preamble signal 114 calculates transmission weights corresponding to the subcarriers to be used for the preamble signals based on the extracted propagation channels corresponding to the subcarriers (step S406). Next, the weighting processing unit for preamble signal 114 performs a weighting process using the calculated transmission weights and the preamble signals, and generates weighted preamble signals (step S407).

In addition, in parallel with step S407, the weighting processing unit 104 calculates transmission weights for subcarriers other than the subcarriers for the preamble signals (step S408), and generates a weighted data signal using the transmission weights for the subcarriers other than the subcarriers for the preamble signals and a data signal (step S409).

Next, the access point 200-1 first transmits the generated preamble signals and then transmits the data signal a prescribed time after the notification signal transmitted from the station 201-2 has been received (step S410). Here, even if the generation of the data signal has not been completed, the preamble signals may be transmitted if the prescribed time has elapsed.

Accordingly, in the station 201-1, the wireless units 301-1 to 301-D receive the data signal transmitted from the access point 200-1 (step S204). Then, when reception of the data ends, the station 201-1 transmits an ACK to the access point 200-1 (step S205).

The access point 200-1 executes a predetermined process corresponding to the reception of the ACK, which has been transmitted from the station 201-1 in response to completion of the transmission of the data signal (step S411).

In accordance with the above-described second embodiment, it is possible to shorten a time required for generating preamble signals because the extracting unit 115 extracts propagation channels corresponding to subcarriers to be used for the preamble signals from among propagation channels and the weighting processing unit for preamble signal 114 calculates transmission weights for the subcarriers to be used for the preamble signals and generates weighted preamble signals in parallel with calculation of transmission weights for all subcarriers and generation of a weighted data signal in the weighting processing unit 104.

Third Embodiment

Next, the third embodiment of the present invention will be described.

[Configuration of Access Point]

Figure 8:
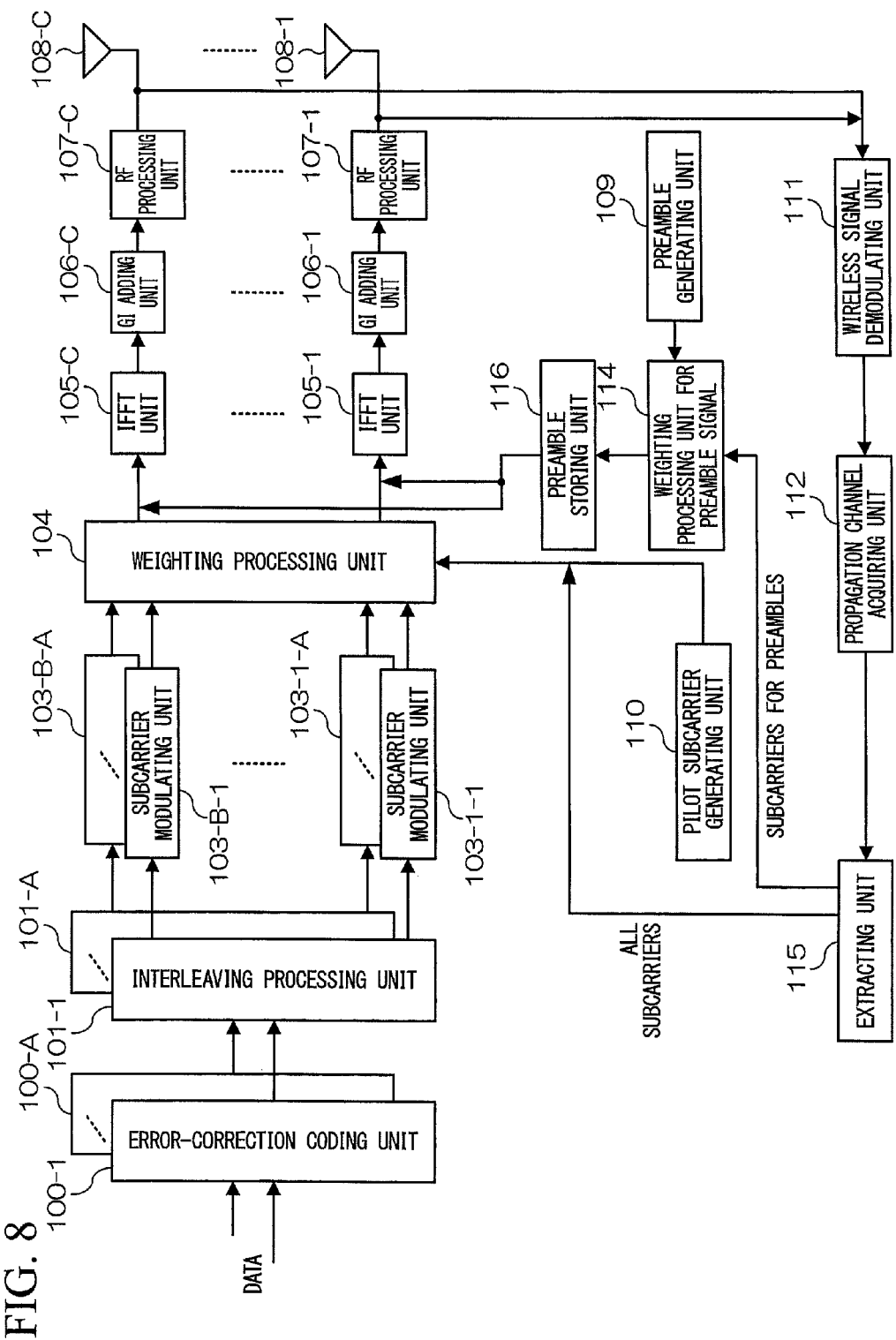
FIG. 8 is a block diagram showing a schematic configuration of the access points 200-1 and 200-2 in the third embodiment of the present invention.

FIG. 8 is a block diagram showing a schematic configuration of the access points 200-1 and 200-2 in the third embodiment of the present invention. As shown in FIG. 8, the access points 200-1 and 200-2 each include error-correction coding units 100-1 to 100-A, interleaving processing units 101-1 to 101-A, subcarrier modulating units 103-1-1 to 103-B-A, a weighting processing unit 104, IFFT units 105-1 to 105-C, GI adding units 106-1 to 106-C, RF processing units 107-1 to 107-1C, antennas 108-1 to 108-C, a preamble generating unit 109, a pilot subcarrier generating unit 110, a wireless signal demodulating unit 111, a propagation channel acquiring unit 112, a weighting processing unit for preamble signal 114, an extracting unit 115, and a preamble storing unit 116.

It is to be noted that because the error-correction coding units 100-1 to 100-A, the interleaving processing units 101-1 to 101-A, the subcarrier modulating units 103-1-1 to 103-B-A, the weighting processing unit 104, the IFFT units 105-1 to 105-C, the GI adding units 106-1 to 106-C, the RF processing units 107-1 to 107-C, the antennas 108-1 to 108-C, the preamble generating unit 109, the pilot subcarrier generating unit 110, the wireless signal demodulating unit 111, the propagation channel acquiring unit 112, the weighting processing unit for preamble signal 114, and the extracting unit 115 have configurations similar to those shown in FIG. 2 or those shown in FIG. 6, a description thereof is omitted.

The preamble storing unit 116 stores the weighted preamble signals which are calculated by the weighting processing unit for preamble signal 114 for each destination station. That is, the weighted preamble signals are generated by multiplying preamble signals, which are fixed signals, by weights pre-calculated from propagation channels of subcarriers for the preamble signals, and stored in the preamble storing unit 116. Thereby, since it is not necessary to generate the weighted preamble signals for each wireless packet transmission, it is possible to shorten the processing time.

[Configuration of Station]

Because the configurations of the stations 201-1 and 201-2 in the present third embodiment are similar to that of FIG. 3, a description thereof is omitted.

[Example of Communication Procedure Among Access Points and Stations]

Figure 9:
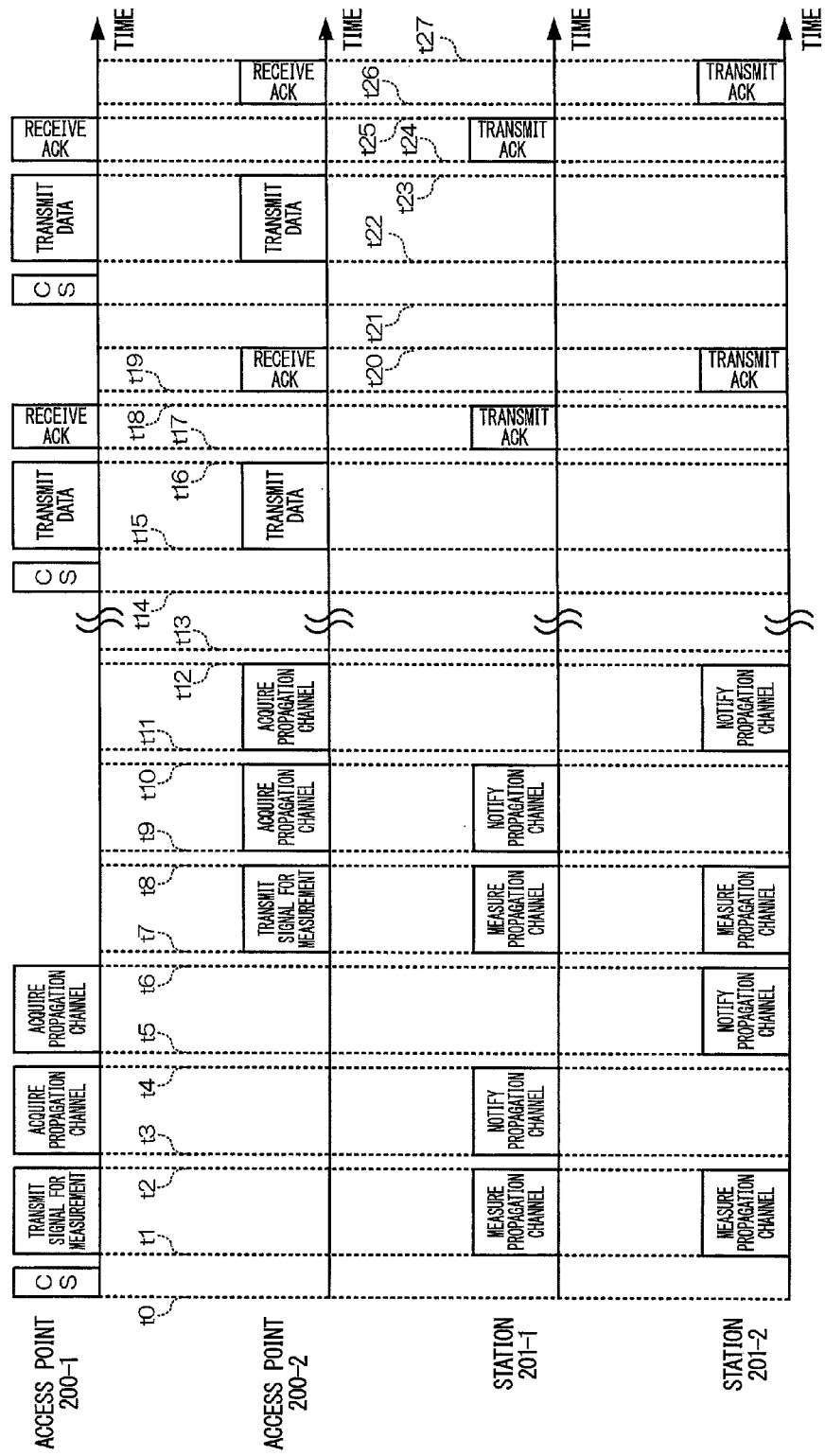
FIG. 9 is a timing chart showing an example of a communication procedure among the access points 200-1 and 200-2 and the stations 201-1 and 201-2 in the third embodiment of the present invention.

FIG. 9 is a timing chart showing an example of a communication procedure among the access points 200-1 and 200-2 and the stations 201-1 and 201-2 in the present third embodiment. In the present third embodiment, first, the access points 200-1 and 200-2 pre-calculate weighted preamble signals corresponding to the stations 201-1 and 201-2 at a predetermined timing and store them in the preamble storing unit 116. Thereafter, every time transmission target data is generated, the access points 200-1 and 200-2 read the weighted preamble signals corresponding to the destination stations 201-1 and 201-2 from the preamble storing unit 116, perform setting, and transmit the data. In this manner, in the present third embodiment, an operation of calculating and storing the weighted preamble signals and transmission/reception of the data are performed at separate opportunities.

First, when the timing of generating the weighted preamble signals is reached, the access point 200-1 executes a carrier sense for transmitting a signal for measurement of propagation channels at random time intervals. It is to be noted that the following timings are conceivable as timings at which the weighted preamble signals should be generated.

For example, for one of the timings, the generation and storage of the weighted preamble signals corresponding to the stations 201-1 and 201-2 with which connections have been established at that time are sequentially performed as initial setting performed when the access point 200-1 has been activated. In addition, for other timing, the generation and storage of the weighted preamble signals corresponding to the stations 201-1 and 201-2, which are communication partners, are performed when transmission and reception of data are first performed after the activation of the access point 200-1.

In FIG. 9, it is assumed that the idle state has been detected by a carrier sense executed by the access point 200-1 at time to. Accordingly, in a period from time t1 at which a fixed time has elapsed from time t0 to time t2, the access point 200-1 generates and transmits a signal for measurement of propagation channels. At this time, the access point 200-1 transmits the signal for measurement with the stations 201-1 and 201-2 selected as targets for which the weighted preamble signals are generated designated as the destinations.

In response to reception of the above signal for measurement, the stations 201-1 and 201-2 measure the performances of the propagation channels within the same period from time t1 to time t2. Then, the stations 201-1 and 201-2 transmit propagation channel performance notification signals in a period from time t3 to time t4 and a period from time t5 to time t6, respectively.

The access point 200-1 generates weighted preamble signals using the received propagation channel performance notification signals and stores the generated weighted preamble signals in the preamble storing unit 116. It is to be noted that when the weighted preamble signals are stored in the preamble storing unit 116, they are stored in association with addresses (MAC addresses) of the stations 201-1 and 201-2 designated as the destinations of the signal for measurement.

Likewise, the access point 200-2 also generates the weighted preamble signals in accordance with a timing chart similar to that of the access point 200-1, and stores the generated weighted preamble signals in the preamble storing unit 116.

Then, as described above, at a predetermined timing after the weighted preamble signals have been stored, transmission target data for which the stations 201-1 and 201-2 corresponding to the stored weighted preamble signals are designated as the destinations is assumed to have been generated in the access points 200-1 and 200-2. Accordingly, the access point 200-1 executes a carrier sense (CS). Here, an idle state is detected by the carrier sense executed at a timing of time t14 shown in FIG. 9. Accordingly, before time t15, which is the data transmission start timing, is reached, the access points 200-1 and 200-2 read the weighted preamble signals corresponding to the stations 201-1 and 201-2, which are destinations of the transmission target data.

Next, the access points 200-1 and 200-2 start transmission of the weighted preamble signals and the transmission target data for the station 201-1 or 201-2 in a period from time t15 to time t16.

The station 201-1 transmits an ACK in a period from time t17 at which a predetermined time has elapsed from time t16 to time t18 in response to completion of the data transmission, and the access point 200-1 receives the ACK. Likewise, the station 201-2 transmits an ACK in a period from time t19 at which a predetermined time has elapsed from time t18 to time t20 after the ACK has been transmitted by the station 201-1, and the access point 200-2 receives the ACK.

It is to be noted that a case in which a plurality of frames (packets) have been generated as the transmission target data is assumed here. Accordingly, FIG. 9 shows a state in which transmission and reception of data in units of frames and ACKs are executed sequentially after the above-described transmission and reception of the data and ACKs from time t14 to time t20. In a period from time t21 to time t27, transmission and reception of the final data and ACKs are shown.

[Example of Processing Procedure]

Figure 10:
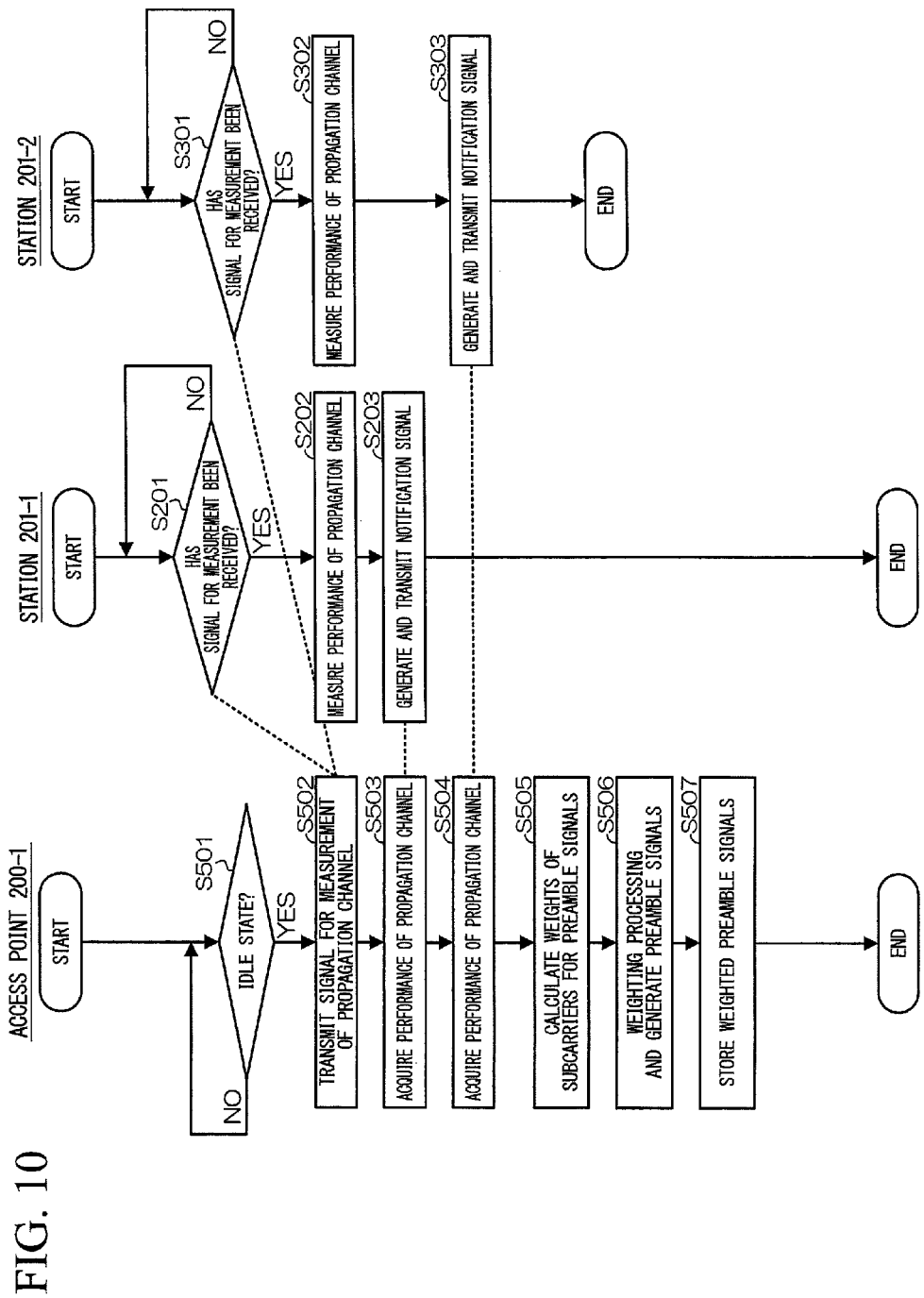
FIG. 10 is a flowchart showing a processing procedure to be executed by the access point 200-1 and the stations 201-1 and 201-2 with respect to generation of weighted preamble signals in the third embodiment of the present invention.

FIG. 10 is a flowchart describing a processing procedure to be executed by the access point 200-1 and the stations 201-1 and 201-2 so as to deal with generation of weighted preamble signals in the present third embodiment. It is to be noted that the process shown in FIG. 10 is a process of generating weighted preamble signals corresponding to the stations 201-1 and 201-2.

When the timing at which the generation and storage of the weighted preamble signals corresponding to the stations 201-1 and 201-2 should be executed is reached, the access point 200-1 executes a process of steps S01 to S507. It is to be noted that because the process of steps S501 to S506 is similar to steps S402 to S407 in FIG. 7, a description thereof is omitted.

After the above-described process of steps S501 to S506, the generated weighted preamble signals are stored in the preamble storing unit 116 (step S507). At this time, the generated weighted preamble signals are stored in association with addresses of the stations 201-1 and 201-2 to which a signal for measurement has been transmitted in order to generate the current preamble signals.

In addition, the station 201-1 executes the process of steps S201 to S203 in response to the transmission of the signal for measurement from the access point 200-1. Likewise, the station 201-2 executes the process of steps S301 to S303 in response to the transmission of the signal for measurement from the access point 200-1. Because the processes of the stations 201-1 and 201-2 are similar to steps S201 to S203 and steps S301 to S303 shown in FIGS. 5 and 7, a description thereof is omitted.

Figure 11:
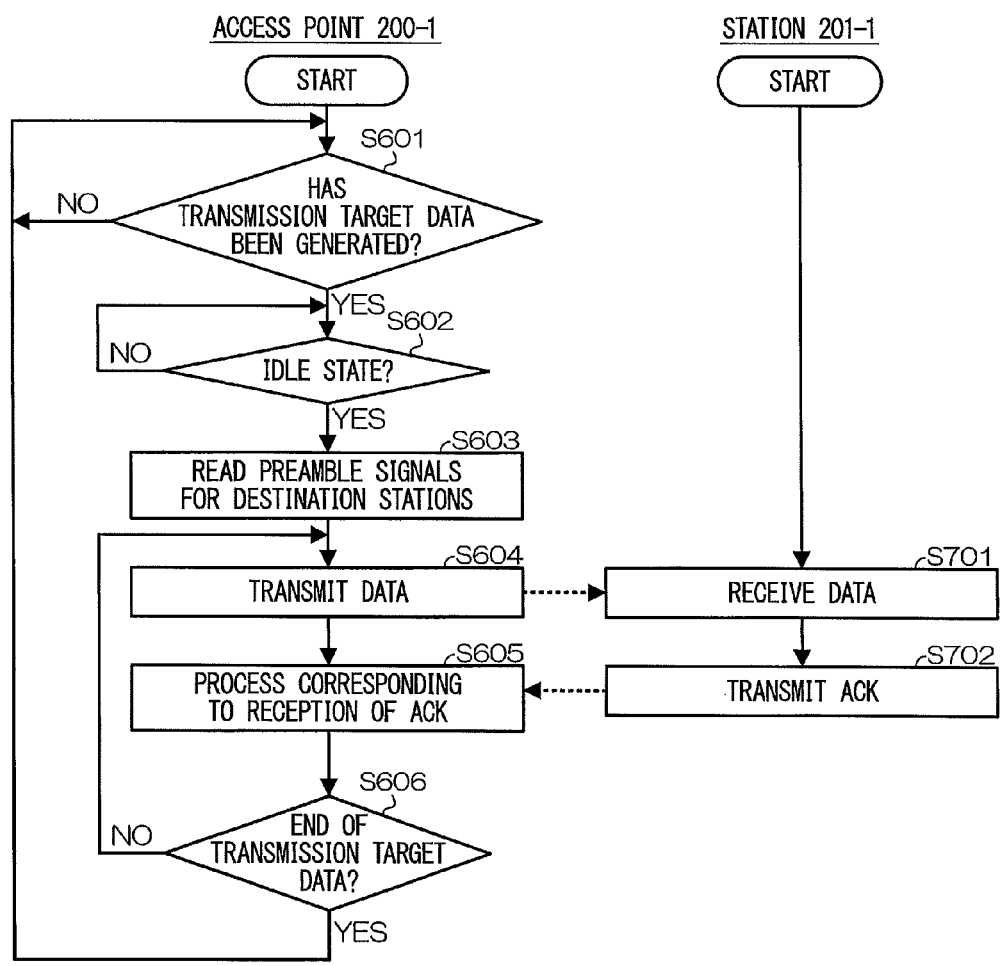
FIG. 11 is a flowchart describing a processing procedure to be executed by the access point 200-1 and the station 201-1 for data transmission and reception in the third embodiment of the present invention.

FIG. 11 is a flowchart describing a processing procedure to be executed by the access point 200-1 and the station 201-1 for data transmission and reception in the present third embodiment. The access point 200-1 determines whether transmission target data has been generated (step S601) and waits for the transmission target data to be generated if the transmission target data is not generated (NO of step S601). Then, if the transmission target data has been generated (YES of step S601), the access point 200-1 performs a carrier sense and determines whether the idle state has been detected (step S602). Then, if the idle state has not been detected (NO of step S602), the access point 200-1 waits until the idle state is detected.

Then, if a carrier sense is executed and the idle state is detected (YES of step S602), the access point 200-1 reads the weighted preamble signals associated with the addresses of the stations 201-1 and 201-2, which are the destinations of the transmission target data, from the preamble storing unit 116 (step S603). Next, the access point 200-1 transmits the transmission target data to the station 201-1 in units of frames (step S604).

On the other hand, the station 201-1 receives the data transmitted from the access point 200-1 in step S604 (step S701), and transmits an ACK to the access point 200-1 when reception of the data ends (step S702).

After the transmission of the data, the access point 200-1 receives the ACK transmitted from the station 201-1 and executes a predetermined process corresponding to reception of the ACK (step S605).

When the above-described data transmission (step S604) and the process corresponding to the reception of the ACK (step S605) end, the access point 200-1 determines whether the transmission of all transmission target data (frames) has ended (step S606). Here, if transmission target data that has not been transmitted still remains (NO of step S606), the process returns to the above step S604 and the data transmission is executed again. Then, when all the transmission target data is transmitted (YES of step S606), the process returns to step S601.

In accordance with the above-described third embodiment, the weighting processing unit for preamble signal 114 multiplies preamble signals, which are fixed signals, by weights pre-calculated from propagation channels of subcarriers for the preamble signals to generate weighted preamble signals, and stores them in the preamble storing unit 116, and thus it is not necessary to generate weighted preamble signals for each transmission of a wireless packet and it is possible to further shorten the processing time.

Figure 12:
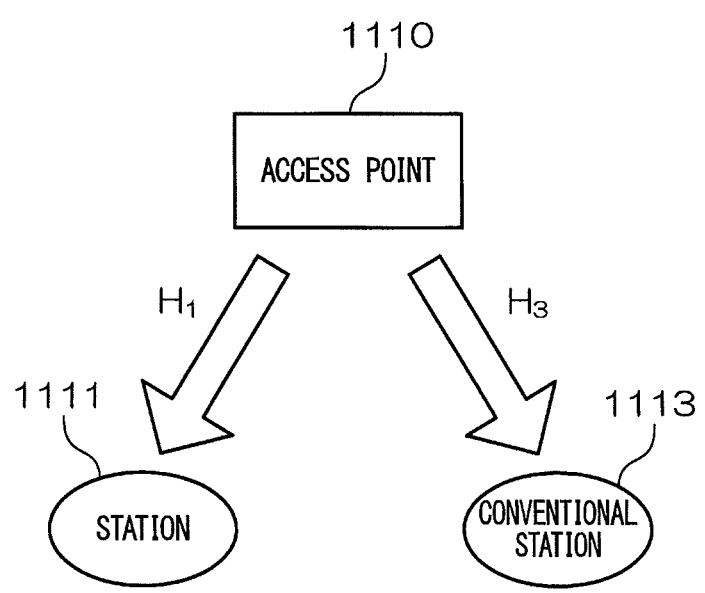
FIG. 12 is a block diagram showing a configuration of an MU-MIMO transmission system in fourth to seventh embodiments of the present invention.

Next, FIG. 12 is a block diagram showing a configuration of an MU-MIMO transmission system in accordance with fourth to seventh embodiments of the present invention. In FIG. 12, the MU-MIMO transmission system is configured by an access point 1110 (transmitting station apparatus), a station 1111 (a 11ac station: first receiving station) configured in the same standard (first standard) as that of the access point 1110, and a station 1113 (a 11n station: second receiving station) configured in an earlier standard (second standard) than the standard of the access point 1110. In the fourth to seventh embodiments of the present invention, the access point 1110 performs MU-MIMO transmission for the station 1111 configured in the same standard as that of the access point 1110 and the conventional station 1113 configured in the previous standard. In the fourth to seventh embodiments of the present invention, the station 1113 is configured in the standard earlier than that of the access point 1110. Thus, in the fourth to seventh embodiments of the present invention, the station 1113 is referred to as the "conventional station 1113." In addition, $H_1$ and $H_3$ represent propagation channels.

Fourth Embodiment

First, the fourth embodiment of the present invention will be described.

When the access point 1110 performs transmission simultaneously for the station 1111 of the same standard as that of the access point 1110 and the station 1113 of the conventional standard, the access point 1110 performs spatial division multiplexing using beamforming on all signals after an L-LTF including preamble signals. In accordance with this process, the access point 1110 performs transmission simultaneously for both the station 1111 of the same standard and the station 1113 of the conventional standard.

It is possible to perform simultaneous transmission without causing interference between the station 1111 of the same standard and the station 1113 of the conventional standard by performing the spatial division multiplexing. At this time, propagation channel information is necessary to perform the beamforming. However, a pilot signal transmitted from the station 1111 interferes with a pilot signal transmitted from the station 1113. Therefore, propagation channel information from the stations is not essentially obtained for pilot subcarriers. Thus, it is impossible to perform beamforming on the subcarriers.

Therefore, in the fourth embodiment, a weight for a pilot subcarrier is calculated using a weight calculated from a subcarrier (e.g., a subcarrier adjacent to the pilot subcarrier) other than the pilot subcarrier (weight interpolation). Then, weighting is performed on all signals after the L-LTF.

Thereby, it is possible to perform beamforming of both preamble signals and pilot signals for the station 1111 configured in the same standard as that of the access point 1110 and the conventional station 1113 configured in the previous standard, which are connected to the access point 1110. Thus, it is possible to perform transmission simultaneously, i.e. spatial division multiplexing transmission, for the station 1111 (11ac station) of the same standard and the station 1113 (11n station) of the conventional standard.

<Configuration of Access Point>

Figure 13:
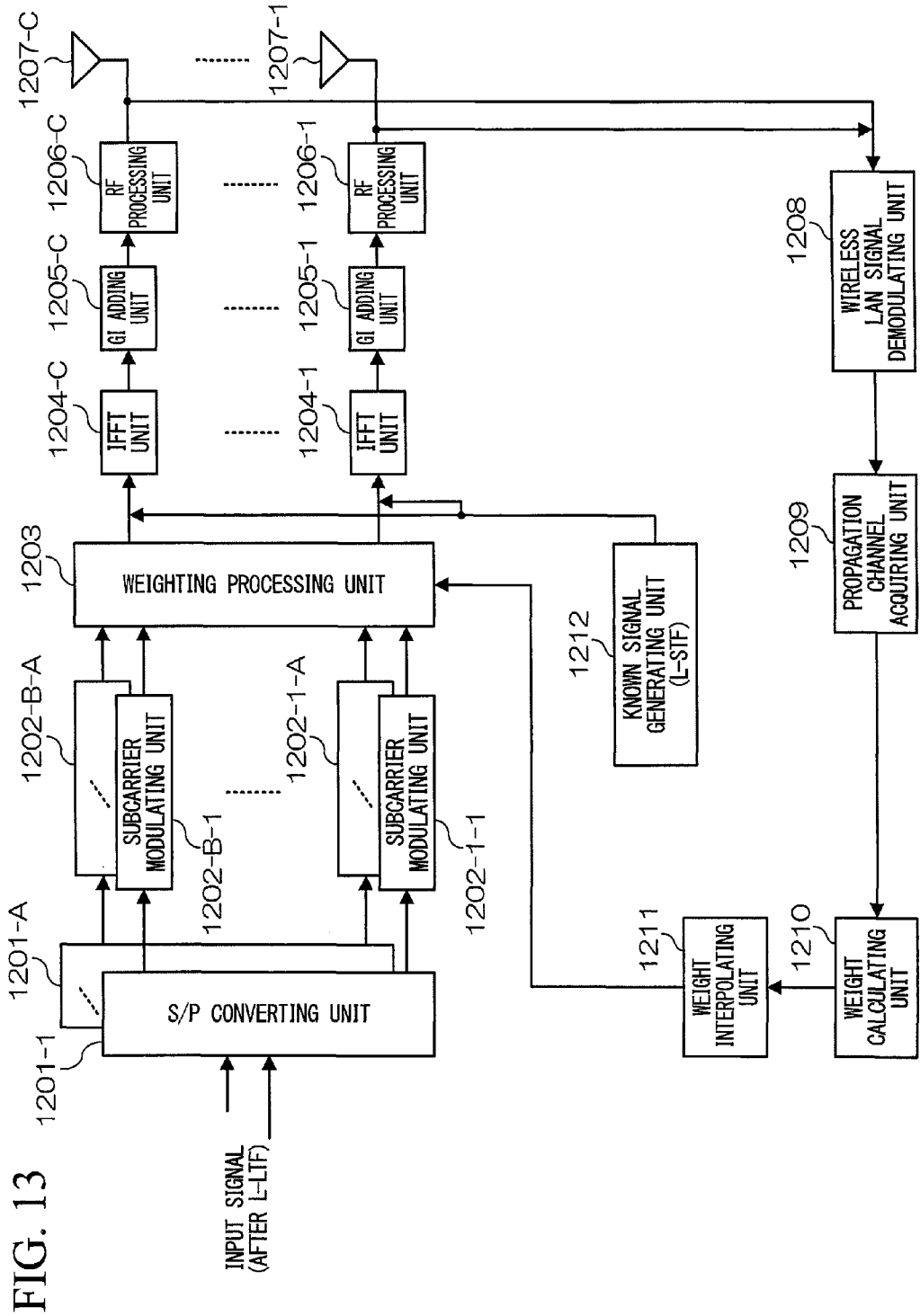
FIG. 13 is a block diagram showing a functional configuration of an access point 1110 in the fourth embodiment.

FIG. 13 is a block diagram showing a functional configuration of the access point 1110 in the fourth embodiment. As shown in FIG. 13, the access point 1110 is provided with serial/parallel (S/P) converting units 1201-1 to 1201-A, subcarrier modulating units 1202-1-1 to 1202-B-A, a weighting processing unit 1203, IFFT units 1204-1 to 1204-C, GI adding units 1205-1 to 1205-C, RF processing units 1206-1 to 1206-C, antennas 1207-1 to 1207-C, a wireless LAN signal demodulating unit 1208, a propagation channel acquiring unit 1209, a weight calculating unit 1210, a weight interpolating unit 1211, and a known signal generating unit 1212.

Figure 24:
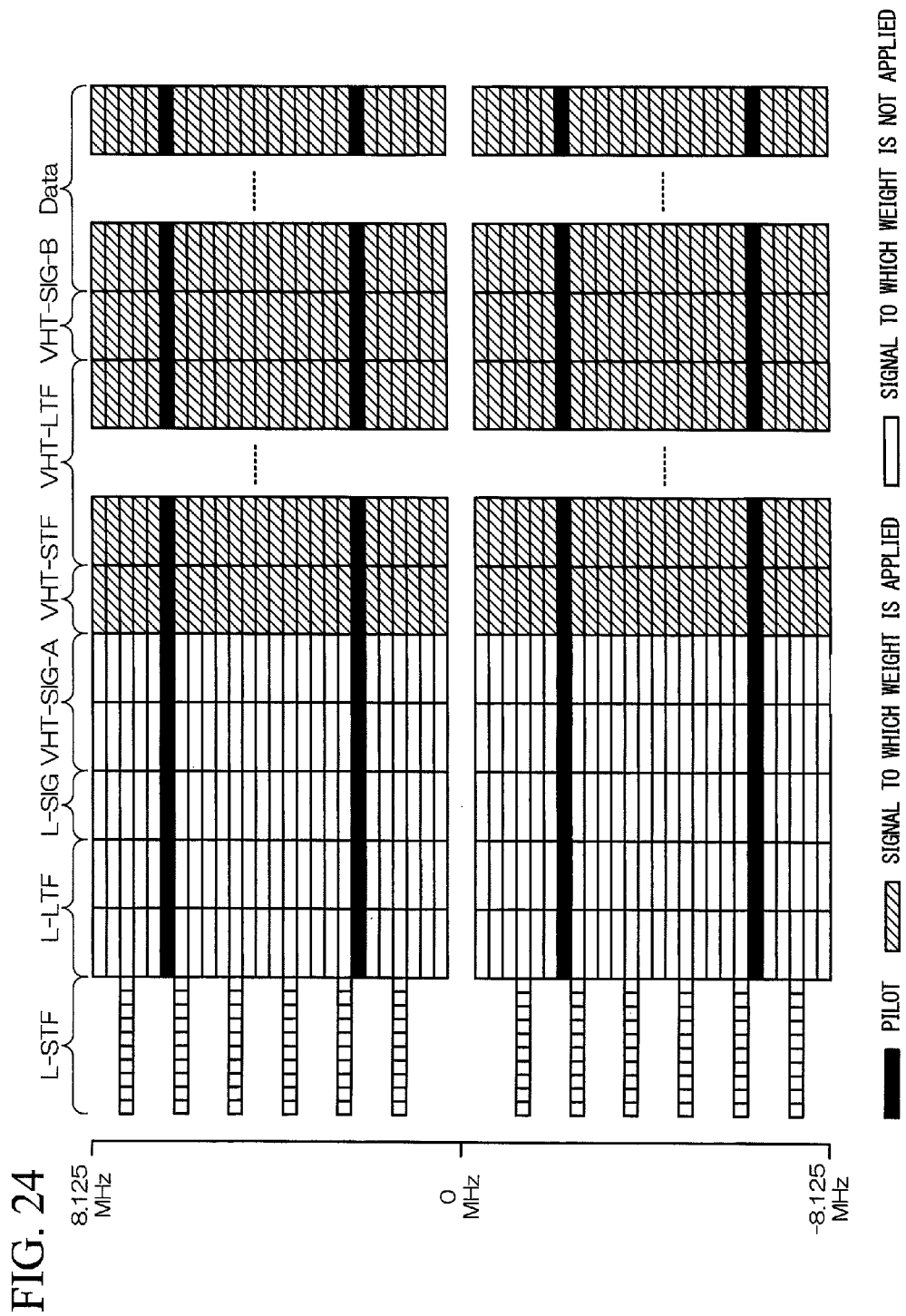
FIG. 24 is a conceptual diagram showing a configuration of a wireless signal using a band of 20 MHz in an IEEE 802.11ac standard described in Non-Patent Document 3.
Figure 25:
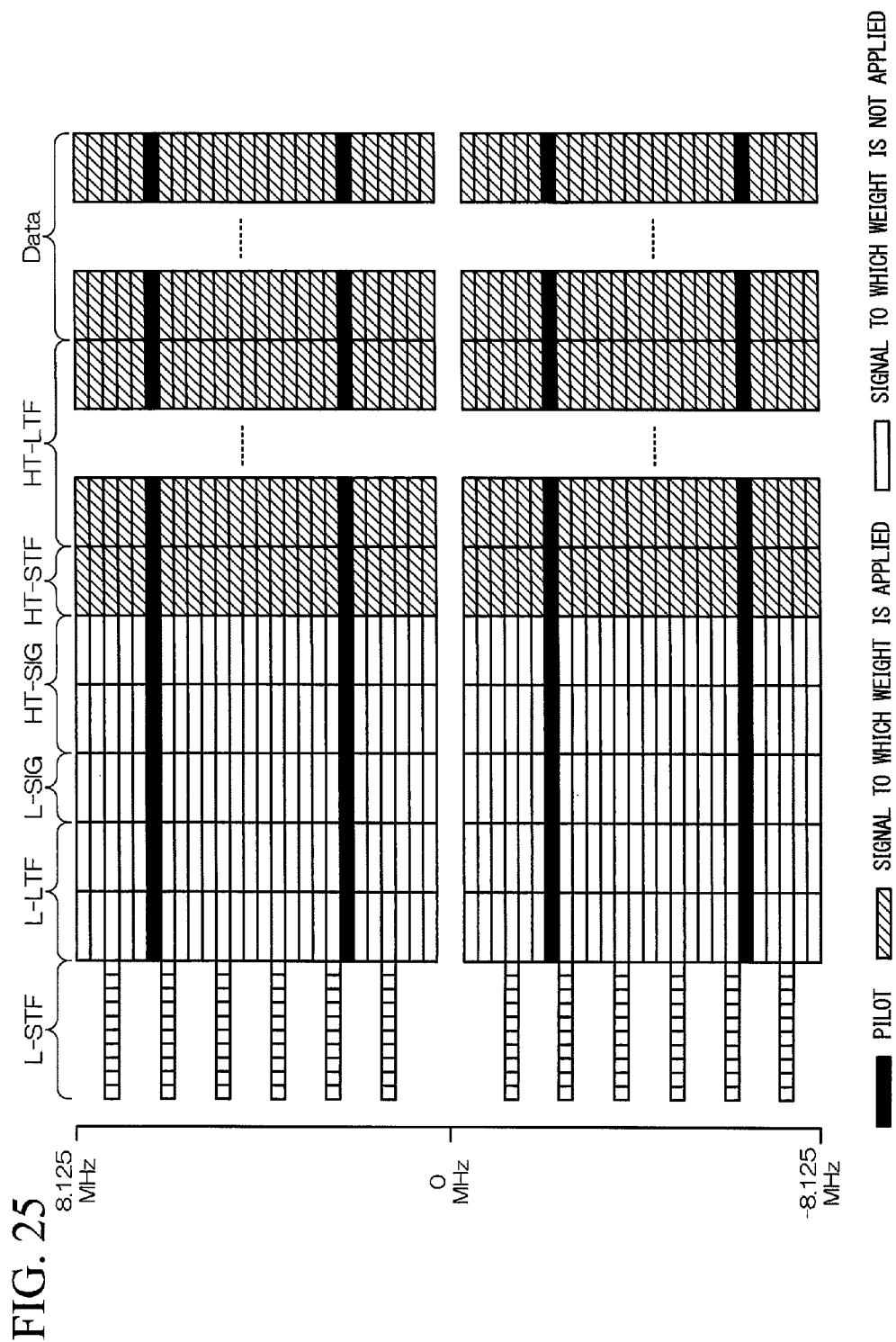
FIG. 25 is a conceptual diagram showing a configuration of a wireless signal using a band of 20 MHz in an IEEE 802.11n standard described in Non-Patent Document 4.

The S/P converting units 1201-1 to 1201-A divide input signals and output the divided signals to the subcarrier modulating units 1202. The input signals are data after the L-LTF shown in FIGS. 24 and 25. The subcarrier modulating units 1202-1-1 to 1202-B-A modulate the input signals in accordance with a modulation scheme such as BPSK or QPSK prescribed in a wireless LAN. The weighting processing unit 1203 performs weight multiplication using signals output from the subcarrier modulating units 1202 and weights output from the weight interpolating unit 1211.

The IFFT units 1204-1 to 1204-C transform frequency-series data on which the weighting has been performed into time-series data using IFFT computation. The GI adding units 1205-1 to 1205-C copies a fixed period in a rear end of an IFFT output signal and connects the copied fixed period to a front end of the IFFT output signal. Each of the RF processing units 1206-1 to 1206-C converts a baseband signal to which a GI has been added into a wireless LAN signal using an analog RF apparatus. Each of the antennas 1207-1 to 1207-C radiates the wireless LAN signal into air.

The wireless LAN signal demodulating unit 1208 demodulates wireless LAN signals transmitted from the stations 1111 and 1113 and acquires data portions included in the wireless LAN signals. The propagation channel acquiring unit 1209 acquires propagation channels for all subcarriers excluding pilot subcarriers from the demodulated data portions and stores them. The weight calculating unit 1210 calculates transmission weights for all the subcarriers excluding the acquired pilot subcarriers.

The weight interpolating unit 1211 performs interpolation by generating weights for the pilot subcarriers from the transmission weights for all the subcarriers excluding the pilot subcarriers. Although any method may be used as the generating and interpolating method, as an example, there is a method for generating the weight of a pilot subcarrier from an average of weights for one or more subcarriers adjacent to the pilot subcarrier. The known signal generating unit 1212 generates an L-STF signal as a known signal.

<Configuration of Station>

Next, the configuration of the station 1111 in the fourth embodiment will be described.

Figure 14:
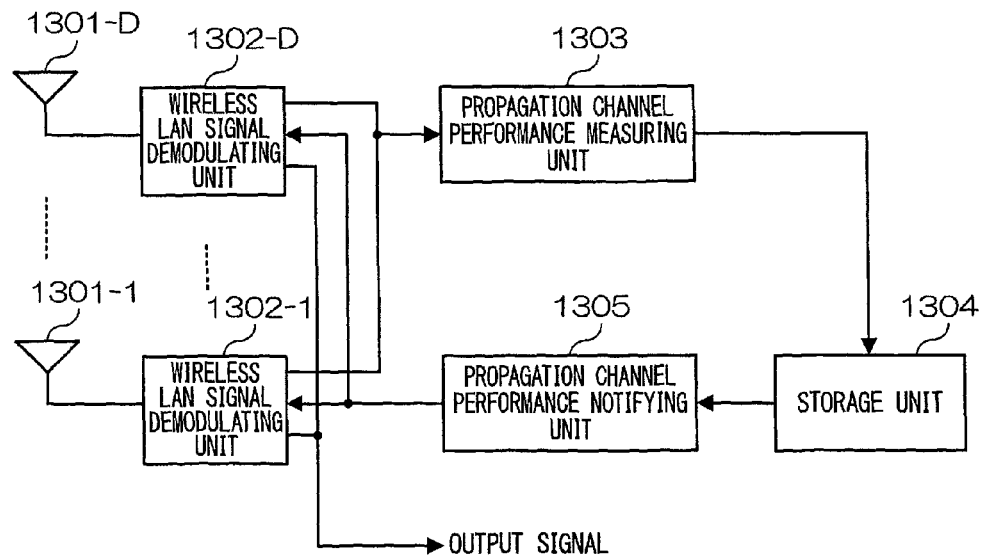
FIG. 14 is a block diagram showing a functional configuration of a station 1111 in the fourth embodiment.

FIG. 14 is a block diagram showing a functional configuration of the station 1111 in the fourth embodiment. As shown in FIG. 14, the station 1111 is provided with antennas 1301-1 to 1301-D, wireless LAN signal demodulating units 1302-1 to 1302-D, a propagation channel performance measuring unit 1303, a storage unit 1304, and a propagation channel performance notifying unit 1305.

The antennas 1301-1 to 1301-D radiate wireless LAN signals into air or receive wireless LAN signals. Each of the wireless LAN signal demodulating units 1302-1 to 1302-D inputs data and a signal to be transmitted, generates a transmission signal by applying framing, a predetermined modulation process, and the like, inputs a received signal and executes a predetermined demodulating process and the like. The propagation channel performance measuring unit 1303 measures propagation channels of subcarriers using preamble signals in a wireless LAN signal transmitted from the access point 1110. The storage unit 1304 stores the propagation channels measured by the propagation channel performance measuring unit 1303. The propagation channel performance notifying unit 1305 generates a signal in which the stored propagation channels are included in a data portion.

Next, the configuration of the station 1113 in the fourth embodiment will be described.

Figure 15:
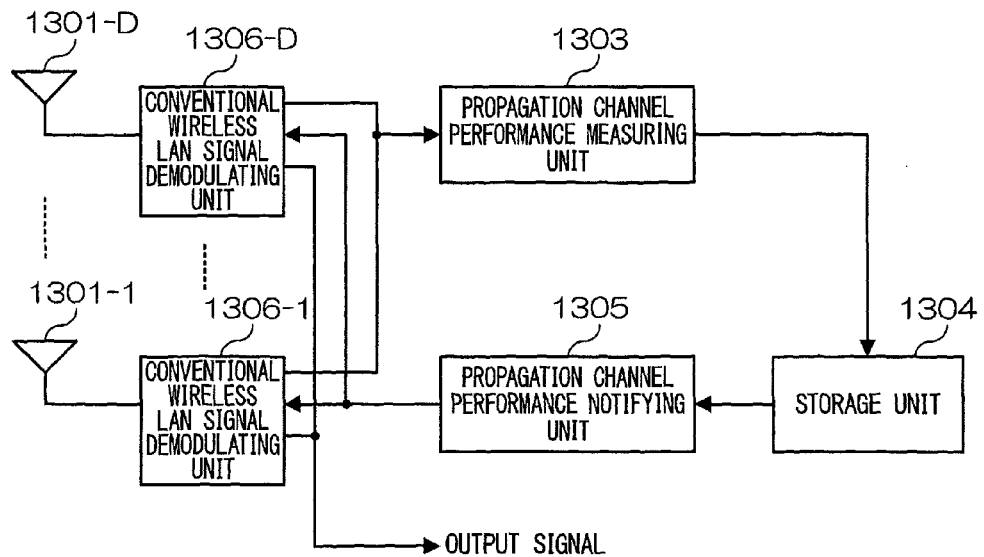
FIG. 15 is a block diagram showing a functional configuration of a station 1113 in the fourth embodiment.

FIG. 15 is a block diagram showing a functional configuration of the station 1113 in the fourth embodiment. As shown in FIG. 15, the station 1113 is provided with antennas 1301-1 to 1301-D, conventional wireless LAN signal demodulating units 1306-1 to 1306-D, a propagation channel performance measuring unit 1303, a storage unit 1304, and a propagation channel performance notifying unit 1305. It is to be noted that portions corresponding to those of FIG. 14 are assigned the same reference signs and a description thereof is omitted.

Each of the conventional wireless LAN signal demodulating units 1306-1 to 1306-D inputs data and a signal to be transmitted, generates a transmission signal by applying framing, a predetermined modulation process, and the like in accordance with a conventional standard, inputs a received signal, and executes a predetermined demodulating process and the like in accordance with the conventional standard.

<Example of Communication Procedure Among Access Points and Stations>

Figure 16:
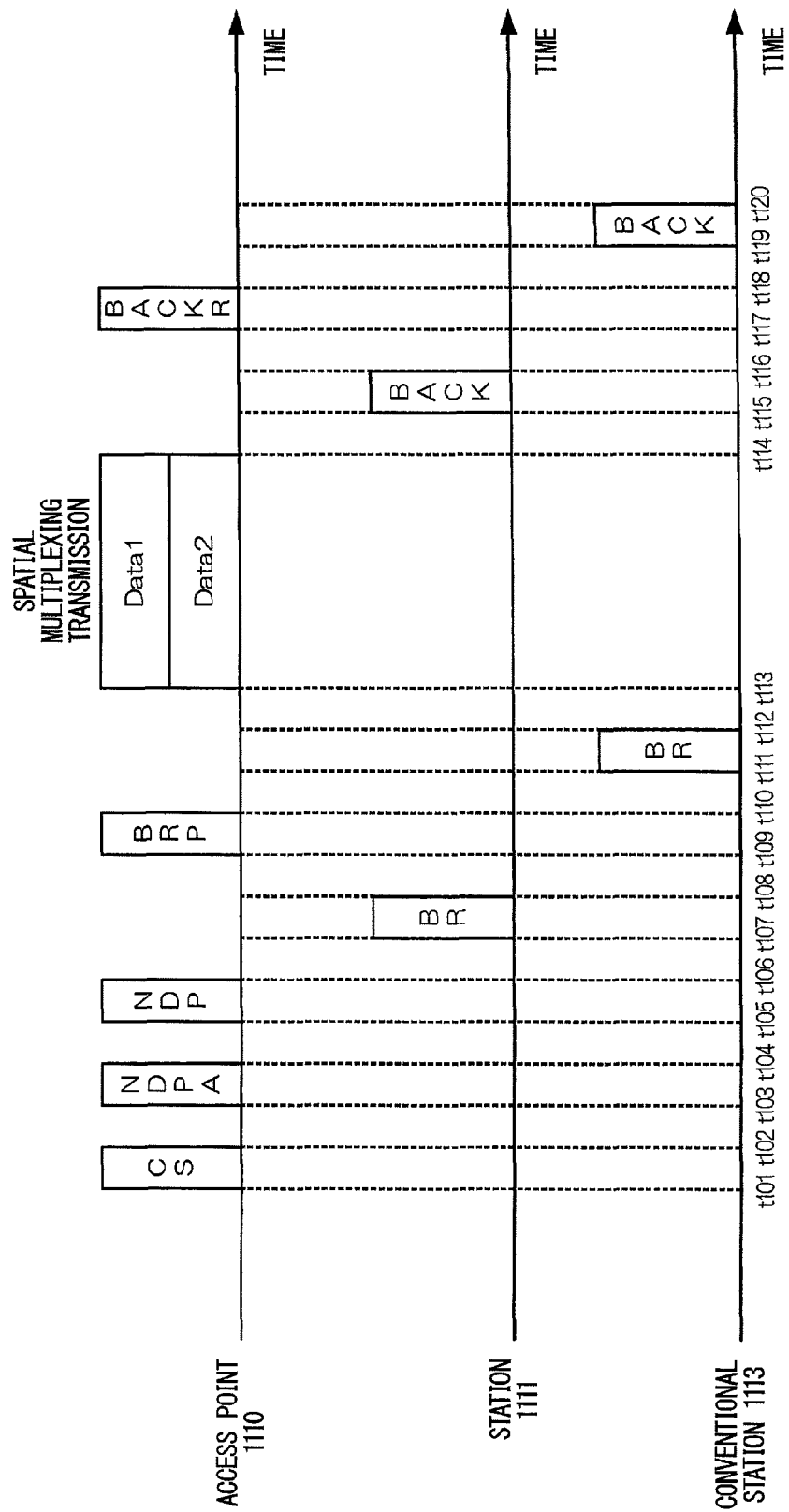
FIG. 16 is a timing chart showing an example of a communication procedure among the access point 1110 and the stations 1111 and 1113 in the fourth embodiment.

FIG. 16 is a timing chart showing an example of a communication procedure among the access point 1110 and the stations 1111 and 1113 in the fourth embodiment. It is to be noted that the description of this drawing assumes that CSMA/CA is adopted for an access control scheme.

Data of a packet (transmission target data) to be transmitted to the stations 1111 and 1113 is assumed to have been generated in the access point 1110. Accordingly, the access point 1110 executes a carrier sense (CS) at random time intervals. As a result of the carrier sense, it is determined whether the state is an idle state in which a communication frequency band is not used or a busy state in which the communication frequency band is used.

For example, as a result of the carrier sense (CS) executed at time t101, the idle state, in which the communication frequency band is not used, is assumed to have been detected. Accordingly, the access point 1110 generates and transmits an NDPA, for example, in a period from time t103 at which a certain time has elapsed from time t102 to time t104.

Next, the access point 1110 generates and transmits an NDP for estimation of propagation channels in a period from time t105 at which a certain time has elapsed from time t104 to time t106. In this case, the access point 1110 recognizes the stations 1111 and 1113 which are destinations of the above transmission target data. Then, the access point 1110 designates the same stations 1111 and 1113 as the destinations and transmits a signal for measurement.

In response to reception of the above signal for measurement, the stations 1111 and 1113 measure the performances of propagation channels within the same period from time t105 to time t106. Then, the stations 1111 and 1113 generate BRs including the performances of the propagation channel or information calculated from the performances of the propagation channels in a period from time t106 to time t107. Next, the station 1111 transmits the BR in a period from time t107 at which a certain time has elapsed from time t106 to time t108.

Next, the access point 1110 generates and transmits a BRP for requesting the station 1113 to transmit propagation channel information in a period from time t109 at which a certain time has elapsed from time t108 to time t110.

Next, the station 1113 transmits the BR in a period from time t111 at which a certain time has elapsed from time t110 to time t112 in response to reception of the above BRP.

Next, in the access point 1110, the weight calculating unit 1210, the weight interpolating unit 1211, the known signal generating unit 1212, and the weighting processing unit 1203 calculate transmission weights using the notified BRs, interpolate weights for pilot subcarriers, and generate a transmission signal. In addition, the access point 1110 transmits transmission target data in a period from time t113 at which a prescribed time has elapsed from time t112 to time t114. It is to be noted that the data to be transmitted in the period from time t113 to time t114 is, for example, converted into a frame suitable for wireless communication. In addition, when frame aggregation has been applied, the data to be transmitted in the period from time t113 to time t114 is a data unit in which a predetermined number of frames are connected.

Then, in response to completion of reception of the data at time t114, the station 1111 transmits a BACK in a period from time t115 at which a certain time has elapsed from time t114 to time t116. The access point 1110 receives the BACK and executes a predetermined process corresponding to reception of the BACK. Specifically, the access point 1110 determines that a receiving end has received the data normally by reason of, for example, reception of the BACK and transitions to a process of transmitting and receiving the next data. In addition, if timeout has been reached without receiving the BACK, the access point 1110 executes a process such as retransmission of the transmission target data.

Next, the access point 1110 generates and transmits a BACKR for requesting the station 1113 to transmit a BACK in a period from time t117 at which a certain time has elapsed from time t116 to time t118.

Next, the station 1113 transmits the BACK in a period from time t119 at which a certain time has elapsed from time t118 to time t120. The access point 1110 receives the BACK and executes a predetermined process corresponding to reception of the BACK.

In accordance with the above-described fourth embodiment, the weight interpolating unit 1211 calculates weights for pilot subcarriers using weights calculated by the weight calculating unit 1210 from subcarriers (adjacent subcarriers) other than the pilot subcarriers (weight interpolation), and the weighting processing unit 1203 performs weighting on all signals after the L-LTF. Thereby, it is possible to perform beamforming of both preamble signals and pilot signals for the station 1111 configured in the same standard as that of the access point 1110 and the conventional station 1113 configured in the previous standard. Thus, it is possible to perform transmission simultaneously, i.e., spatial division multiplexing transmission, for the station 1111 (11ac station) of the same standard and the station 1113 (11n station) of the conventional standard.

Fifth Embodiment

Next, the fifth embodiment of the present invention will be described. In the fifth embodiment, the access point 1110 transmits, without performing beamforming, signals which have the same pattern as a signal portion (L-STF to HT-SIG in FIG. 25) to be transmitted to the station 1113 of the conventional standard without performing beamforming, as preamble signals when transmission is performed simultaneously for the station 1111 of the same standard and the station 1113 of the conventional standard, and then the access point 1110 transmits subsequent portions to the stations 1111 and 1113 with beamforming.

That is, portions transmitted without performing beamforming for which there is a difference between the standards are transmitted in accordance with the conventional standard. Thereby, the signal themselves become the same, and thus no interference occurs. In the fifth embodiment, a configuration of a wireless signal to be transmitted by the access point 1110 to the station 1111 having the same standard is as shown in FIG. 17.

Figure 17:
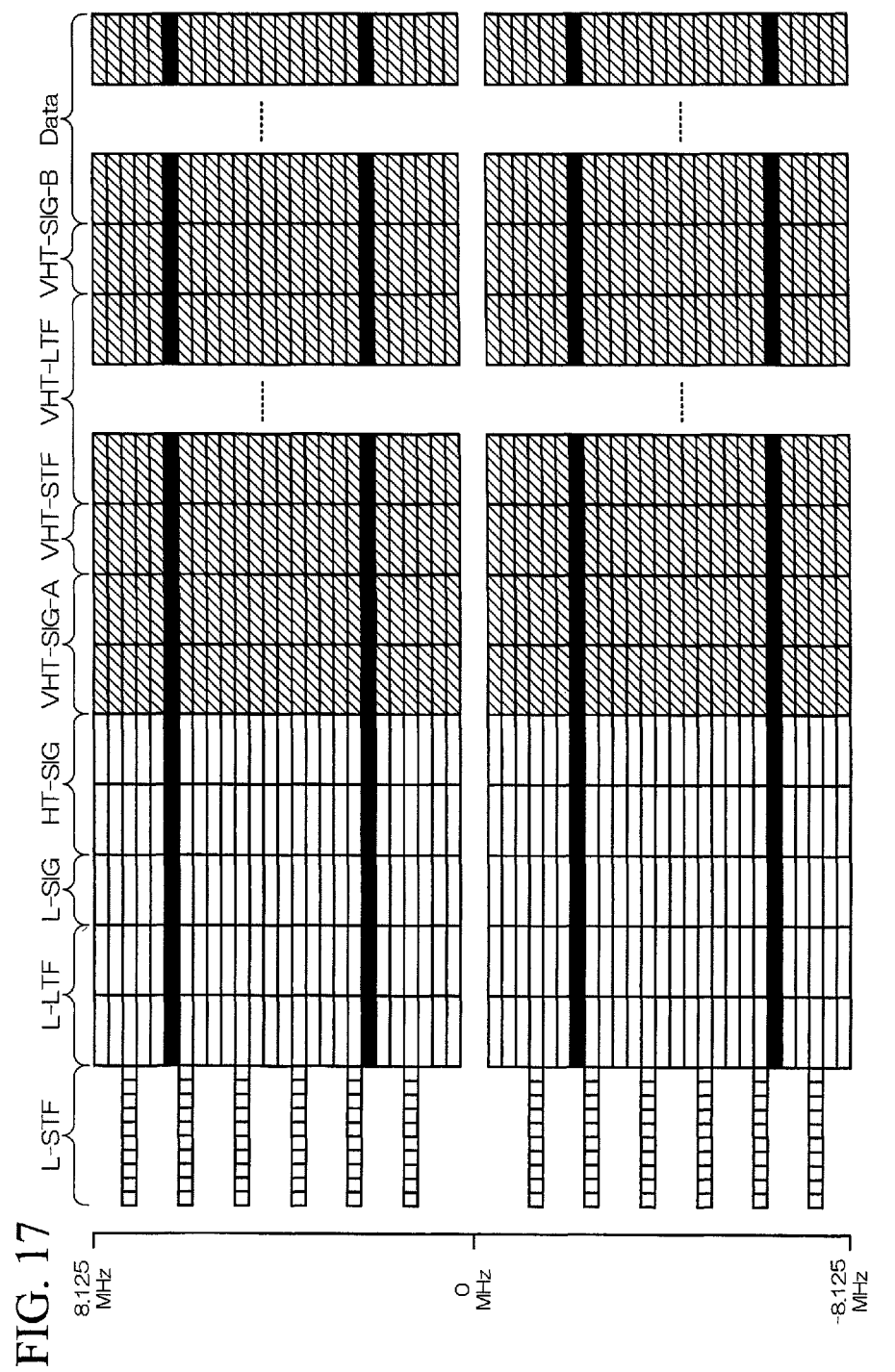
FIG. 17 is a conceptual diagram showing a configuration of a wireless signal to be transmitted by the access point 1110 to the station 1111 of the same standard in the fifth embodiment.

FIG. 17 is a conceptual diagram showing a configuration of a wireless signal to be transmitted by the access point 1110 to the station 1111 of the same standard in the fifth embodiment. In FIG. 17, this wireless signal in accordance with the fifth embodiment is configured by an L-STF, an L-LTF, an L-SIG, an HT-SIG, a VHT-SIG-A, a VHT-STF, a VHT-LTF, a VHT-SIG-B, and Data. With such a configuration, it is possible to prevent an omission of information, which occurs if the VHT-SIG-A is simply replaced with the HT-SIG, from occurring.

<Configurations of Access Point and Station>

Figure 18:
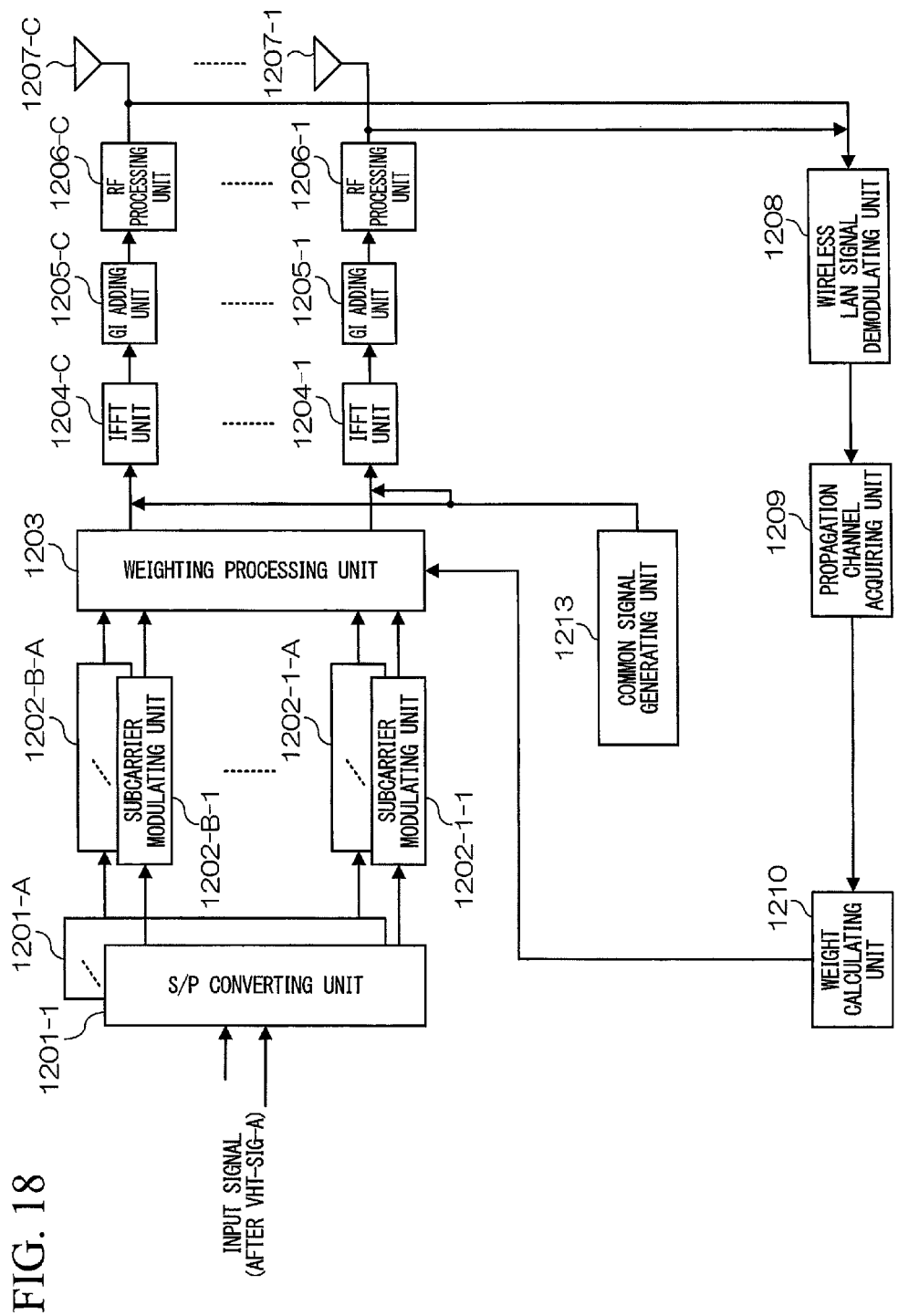
FIG. 18 is a block diagram showing a functional configuration of the access point 1110 in the fifth embodiment.

FIG. 18 is a block diagram showing a functional configuration of the access point 1110 in the fifth embodiment. As shown in FIG. 18, the access point 1110 is provided with S/P converting units 1201-1 to 1201-A, subcarrier modulating units 1202-1-1 to 1202-B-A, a weighting processing unit 1203, IFFT units 1204-1 to 1204-C, GI adding units 1205-1 to 1205-C, RF processing units 1206-1 to 1206-C, antennas 1207-1 to 1207-C, a wireless LAN signal demodulating unit 1208, a propagation channel acquiring unit 1209, a weight calculating unit 1210, and a common signal generating unit 1213. It is to be noted that components corresponding to those of FIG. 13 are assigned the same reference signs and a description thereof is omitted.

In FIG. 18, the common signal generating unit 1213 generates signals (an L-STF, an L-LTF, an L-SIG, an HT-SIG, and pilot signals) to be transmitted to the station 1113 for which transmission beamforming is not performed as common signals. It is to be noted that because the configurations of the stations 1111 and 1113 are similar to those shown in FIGS. 14 and 15, a description thereof is omitted.

<Example of Communication Procedure Among Access Points and Stations]>

Because a communication procedure in the fifth embodiment is similar to the timing chart shown in FIG. 16, a description thereof will be given with reference to FIG. 16.

It is assumed that data of a packet (transmission target data) to be transmitted to the stations 1111 and 1113 has been generated in the access point 1110. Accordingly, the access point 1110 executes a carrier sense (CS) at random time intervals. As a result of the carrier sense, it is determined whether the state is an idle state in which a communication frequency band is not used or a busy state in which the communication frequency band is used.

For example, as a result of the carrier sense (CS) executed at time t101, the idle state, in which the communication frequency band is not used, is assumed to have been detected. Accordingly, the access point 1110 generates and transmits an NDPA, for example, in a period from time t103 at which a certain time has elapsed from time t102 to time t104.

Next, the access point 1110 generates and transmits an NDP for estimation of propagation channels in a period from time t105 at which a certain time has elapsed from time t104 to time t106. In this case, the access point 1110 recognizes the stations 1111 and 1113 which are destinations of the above transmission target data. Then, the access point 1110 designates the same stations 1111 and 1113 as the destinations and transmits a signal for measurement.

In response to reception of the above signal for measurement, the stations 1111 and 1113 measure the performances of propagation channels within the same period from time t105 to time t106. Then, the stations 1111 and 1113 generate BRs including the performances of the propagation channels or information calculated from the performances of the propagation channels in a period from time t106 to time t107.

Next, the station 1111 transmits the BR in a period from time t107 at which a certain time has elapsed from time t106 to time t108.

Next, the access point 1110 generates and transmits a BRP for requesting the station 1113 to transmit propagation channel information in a period from time t109 at which a certain time has elapsed from time t108 to time t110.

Next, the station 1113 transmits the BR in a period from time t111 at which a certain time has elapsed from time t110 to time t112 in response to reception of the above BRP.

Next, in the access point 1110, the weight calculating unit 1210, the common signal generating unit 1213, and the weighting processing unit 1203 perform calculation of transmission weights using the notified BRs and generation of a transmission signal including common signals. In addition, the access point 1110 transmits transmission target data in a period from time t113 at which a prescribed time has elapsed from time t112 to time t114. It is to be noted that the data to be transmitted in the period from time t113 to time t114 is, for example, converted into a frame suitable for wireless communication. In addition, when the frame aggregation has been applied, the data to be transmitted in the period from time t113 to time t114 is a data unit in which a predetermined number of frames are connected.

Then, in response to completion of reception of the data at time t114, the station 1111 transmits a BACK in a period from time t115 at which a certain time has elapsed from time t114 to time t116. The access point 1110 receives the BACK and executes a predetermined process corresponding to reception of the BACK. Specifically, the access point 1110 determines that a receiving end has received the data normally by reason of, for example, the reception of the BACK and transitions to a process of transmitting and receiving the next data. In addition, if timeout has been reached without receiving the BACK, the access point 1110 executes a process such as retransmission of the transmission target data.

Next, the access point 1110 generates and transmits a BACKR for requesting the station 1113 to transmit a BACK in a period from time t117 at which a certain time has elapsed from time t116 to time t118.

Next, the station 1113 transmits the BACK in a period from time t119 at which a certain time has elapsed from time t118 to time t120. The access point 1110 receives the BACK and executes a predetermined process corresponding to reception of the BACK.

In accordance with the above-described fifth embodiment, the common signal generating unit 1213 generates signals (an L-STF, an L-LTF, an L-SIG, an HT-SIG, and pilot signals) to be transmitted to the station 1113 for which transmission beamforming is not performed as common signals and transmits portions transmitted without performing beamforming for which there is a difference between the standards in accordance with the conventional standard, and thus no interference occurs because the signals themselves are the same. Thus, it is possible to simultaneously perform transmission, i.e., spatial division multiplexing transmission, for the station 1111 (11ac station) of the same standard and the station 1113 (11n station) of the conventional standard.

Sixth Embodiment

Next, the sixth embodiment of the present invention will be described. In the sixth embodiment, the access point 1110 performs transmission simultaneously for both the station 1111 of the same standard and the station 1113 of the conventional standard by performing spatial division multiplexing based on beamforming on all signals after the L-LTF when transmission is performed simultaneously for both the station 1111 of the same standard and the station 1113 of the conventional standard as in the fourth embodiment.

By performing the spatial division multiplexing, it is possible to perform simultaneous transmission without causing interference between the station 1111 of the same standard and the station 1113 of the conventional standard. At this time, because propagation channel information from the stations is not essentially obtained for pilot subcarriers, it is impossible to perform beamforming on the subcarriers.

Therefore, in the sixth embodiment, pilot signals of the conventional standard are used and transmitted by an omni-antenna. That is, portions of the pilot signals for which there is a difference between the standards are transmitted in accordance with the conventional standard. Thereby, no interference occurs because the signal themselves are the same and thus it is possible to solve a problem that beamforming is impossible because there is no propagation channel information for the pilot signals.

<Configurations of Access Point and Station>

Figure 19:
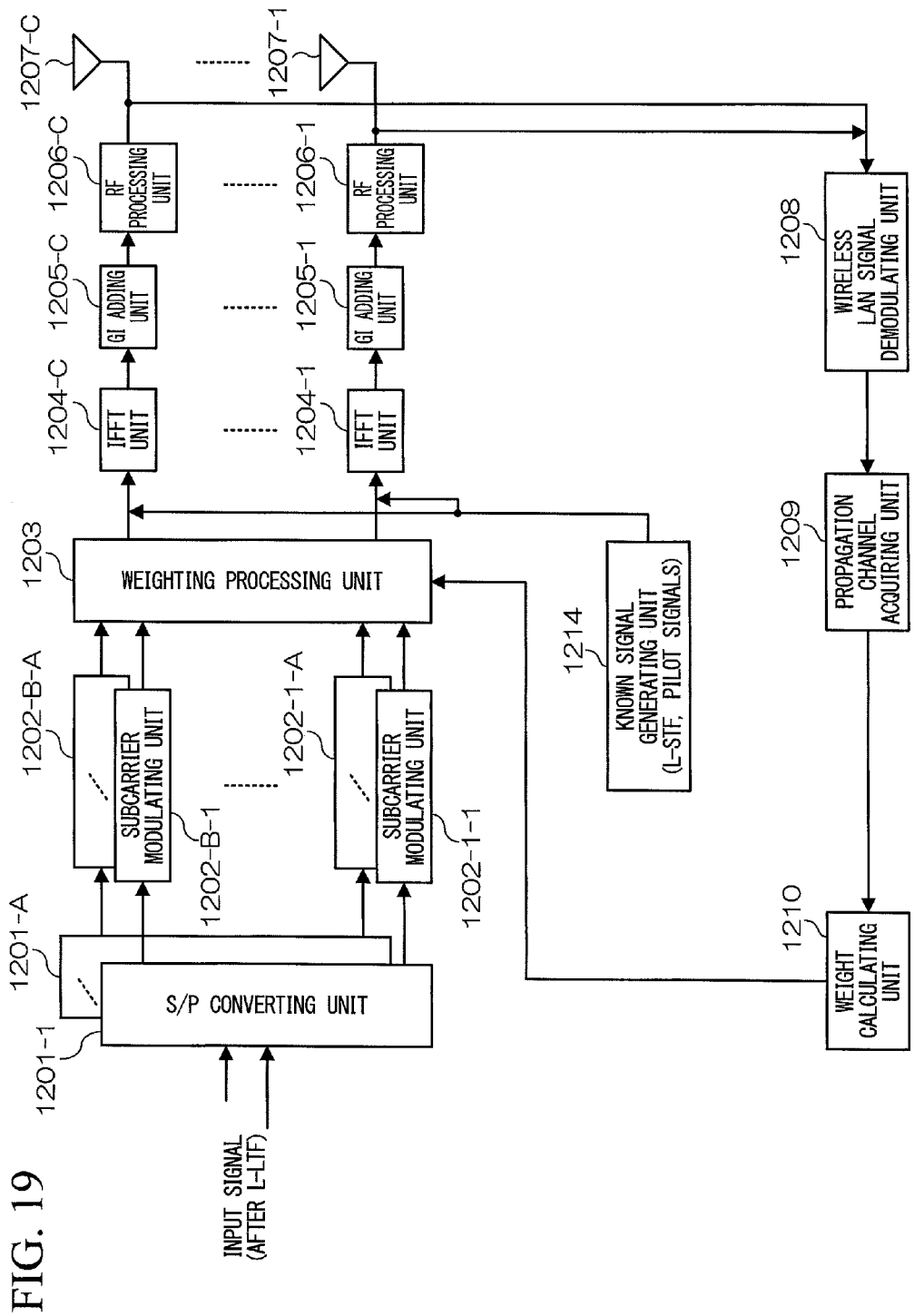
FIG. 19 is a block diagram showing a functional configuration of an access point 1110 in the sixth embodiment.

FIG. 19 is a block diagram showing a functional configuration of the access point 1110 in the sixth embodiment. As shown in FIG. 19, the access point 1110 is provided with S/P converting units 1201-1 to 1201-A, subcarrier modulating units 1202-1-1 to 1202-B-A, a weighting processing unit 1203, IFFT units 1204-1 to 1204-C, GI adding units 1205-1 to 1205-C, RF processing units 1206-1 to 1206-C, antennas 1207-1 to 1207-C, a wireless LAN signal demodulating unit 1208, a propagation channel acquiring unit 1209, a weight calculating unit 1210, and a known signal generating unit 1214. It is to be noted that portions corresponding to those of FIG. 13 are assigned the same reference signs and a description thereof is omitted.

In FIG. 19, the known signal generating unit 1214 generates signals (an L-STF and pilot signals) to be transmitted to the station 1113 without performing transmission beamforming as common signals. It is to be noted that because the configurations of the stations 1111 and 1113 are the same as those shown in FIGS. 14 and 15, a description thereof is omitted.

<Example of Communication Procedure Among Access Points and Stations>

Because a communication procedure in the sixth embodiment is similar to that of the timing chart shown in FIG. 16, a description thereof will be given with reference to FIG. 16.

Data of a packet (transmission target data) to be transmitted to the stations 1111 and 1113 is assumed to have been generated in the access point 1110. Accordingly, the access point 1110 executes a carrier sense (CS) at random time intervals. As a result of the carrier sense, it is determined whether the state is an idle state in which a communication frequency band is not used or a busy state in which the communication frequency band is used.

For example, as a result of the carrier sense executed at time t101, the idle state, in which the communication frequency band is not used, is assumed to have been detected. Accordingly, the access point 1110 generates and transmits an NDPA, for example, in a period from time t103 at which a certain time has elapsed from time t102 to time t104.

Next, the access point 1110 generates and transmits an NDP for estimation of propagation channels in a period from time t105 at which a certain time has elapsed from time t104 to time t106. In this case, the access point 1110 recognizes the stations 1111 and 1113 which are destinations of the above transmission target data. Then, the access point 1110 designates the same stations 1111 and 1113 as the destinations and transmits a signal for measurement.

In response to reception of the above signal for measurement, the stations 1111 and 1113 measure the performances of propagation channels within the same period from time t105 to time t106. Then, the stations 1111 and 1113 generate BRs including the performances of the propagation channels or information calculated from the performances of the propagation channels in a period from time t106 to time t107.

Next, the station 1111 transmits the BR in a period from time t107 at which a certain time has elapsed from time t106 to time t108.

Next, the access point 1110 generates and transmits a BRP for requesting the station 1113 to transmit propagation channel information in a period from time t109 at which a certain time has elapsed from time t108 to time t110.

Next, the station 1113 transmits the BR in a period from time t111 at which a certain time has elapsed from time t110 to time t112 in response to reception of the above BRP.

Next, in the access point 1110, the weight calculating unit 1210, the known signal generating unit 1214, and the weighting processing unit 1203 perform calculation of transmission weights using the notified BRs and generation of a transmission signal including common signals. In addition, the access point 1110 transmits transmission target data in a period from time t113 at which a prescribed time has elapsed from time t112 to time t114. It is to be noted that the data to be transmitted in the period from time t113 to time t114 is converted into, for example, a frame suitable for wireless communication. In addition, when frame aggregation has been applied, the data to be transmitted in the period from time t113 to time t114 is a data unit in which a predetermined number of frames are connected.

Then, in response to completion of reception of the data at time t114, the station 1111 transmits a BACK in a period from time t115 at which a certain time has elapsed from time t114 to time t116. The access point 1110 receives the BACK and executes a predetermined process corresponding to reception of the BACK. Specifically, the access point 1110 determines that a receiving end has received the data normally, for example, by reason of the reception of the BACK and transitions to a process of transmitting and receiving the next data. In addition, if timeout has been reached without receiving the BACK, the access point 1110 executes a process such as retransmission of the transmission target data.

Next, the access point 1110 generates and transmits a BACKR for requesting the station 1113 to transmit a BACK in a period from time t117 at which a certain time has elapsed from time t116 to time t118.

Next, the station 1113 transmits the BACK in a period from time t119 at which a certain time has elapsed from time t118 to time t120. The access point 1110 receives the BACK and executes a predetermined process corresponding to reception of the BACK.

In accordance with the above-described sixth embodiment, the known signal generating unit 1214 generates signals (an L-STF and pilot signals) to be transmitted to the station 1113 for which transmission beamforming is not performed as common signals and transmits them with an omni antenna using pilot signals of the conventional standard, that is, transmits portions of the pilot signal for which there is a difference between the standards in accordance with the conventional standard. Thereby, no interference occurs because the signals themselves are the same and thus it is possible to solve a problem that beamforming is impossible because there is no propagation channel information for the pilot signals.

Seventh Embodiment

Next, the seventh embodiment of the present invention will be described. The seventh embodiment relates to exchange of signals (BACK, BACKR, and the like) after the access point 1110 has performed multiuser-MIMO transmission. When the access point 1110 has performed multiuser-MIMO transmission for a station which transmits an ACK (a station which does not transmit a BACK) and a station which transmits a BACK, the ACK may interference with the BACK. This is because the standard defines that an ACK is necessarily transmitted 16 µs after a signal has been received.

Therefore, in the seventh embodiment, a station which transmits an ACK first transmits the ACK. That is, ACKs, which are response signals, are transmitted successively in a time domain from the station 1111 configured in the same standard as that of the access point 1110 and the conventional station 1113 configured in a previous standard. Thus, it is possible to perform spatial division multiplexing for the station 1111 configured in the same standard as that of the access point 1110 and the conventional station 1113 configured in the previous standard, which are connected to the access point 1110.

<Example of Communication Procedure Among Access Points and Stations>

Figure 20:
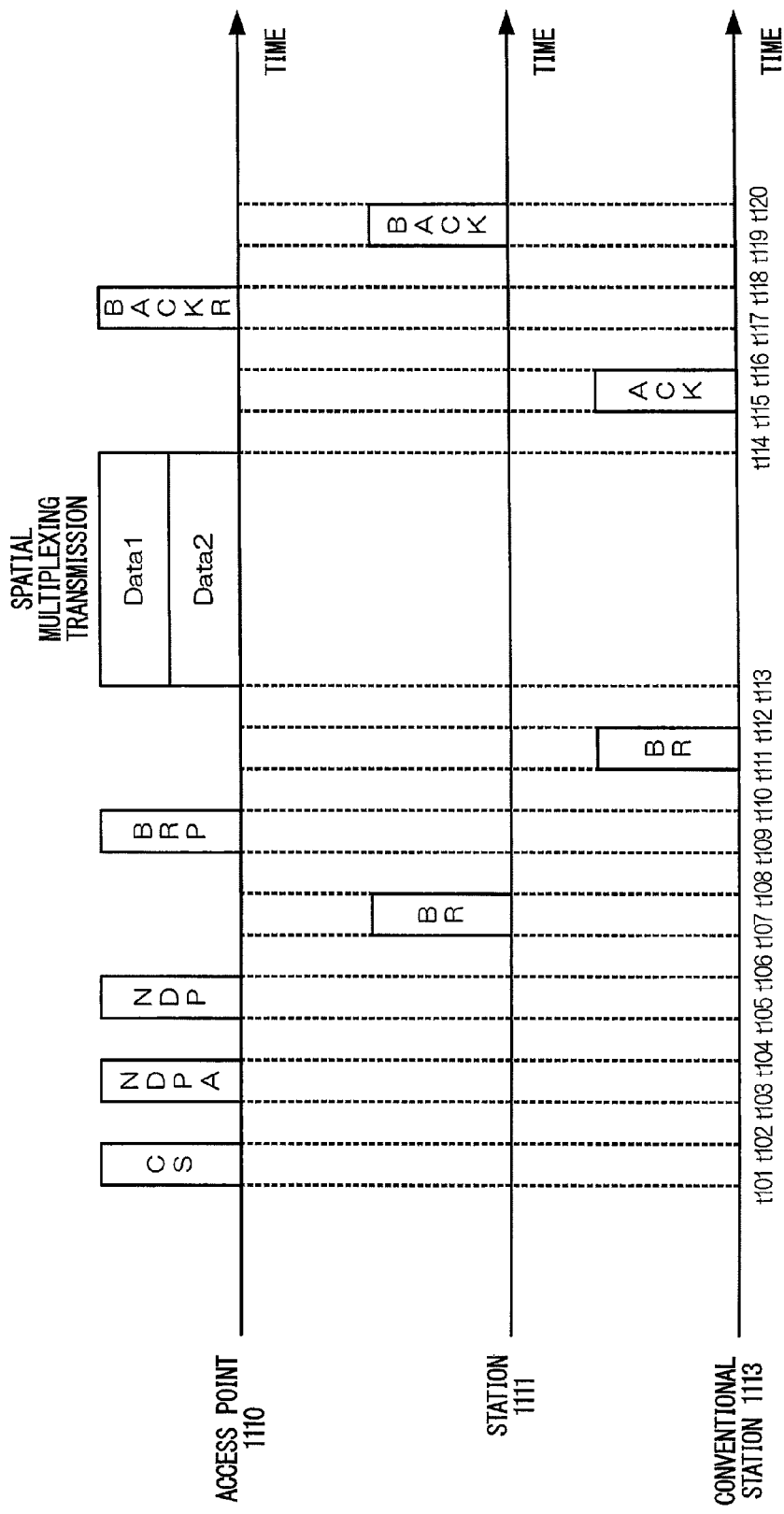
FIG. 20 is a timing chart describing a communication procedure in the seventh embodiment.

FIG. 20 is a timing chart describing a communication procedure in the seventh embodiment. It is to be noted that the conventional station 1113 shown in the drawing is a station which transmits an ACK.

Data of a packet (transmission target data) to be transmitted to the stations 1111 and 1113 is assumed to have been generated in the access point 1110. Accordingly, the access point 1110 executes a carrier sense (CS) at random time intervals. As a result of the carrier sense, it is determined whether the state is an idle state in which a communication frequency band is not used or a busy state in which the communication frequency band is used.

For example, as a result of the carrier sense (CS) executed at time t101, the idle state, in which the communication frequency band is not used, is assumed to have been detected. Accordingly, the access point 1110 generates and transmits an NDPA, for example, in a period from time t103 at which a certain time has elapsed from time t102 to time t104.

Next, the access point 1110 generates and transmits an NDP for estimation of propagation channels in a period from time t105 at which a certain time has elapsed from time t104 to time t106. In this case, the access point 1110 recognizes the stations 1111 and 1113 which are destinations of the above transmission target data. Then, the access point 1110 designates the same stations 1111 and 1113 as the destinations and transmits a signal for measurement.

In response to reception of the above signal for measurement, the stations 1111 and 1113 measure the performances of propagation channels within the same period from time t105 to time t106. Then, the stations 1111 and 1113 generate BRs including the performances of the propagation channels or information calculated from the performances of the propagation channels in a period from time t106 to time t107.

Next, the station 1111 transmits the BR in a period from time t107 at which a certain time has elapsed from time t106 to time t108.

Next, the access point 1110 generates and transmits a BRP for requesting the station 1113 to transmit propagation channel information in a period from time t109 at which a certain time has elapsed from time t108 to time t110.

Next, the station 1113 transmits the BR in a period from time t111 at which a certain time has elapsed from time t110 to time t112 in response to reception of the above BRP.

Next, the access point 1110 performs calculation of transmission weights and generation of a transmission signal including common signals using the notified BRs. In addition, the access point 1110 transmits transmission target data in a period from time t113 at which a prescribed time has elapsed from time t112 to time t114.

Then, in response to completion of reception of the data at time t114, the conventional station 1113 transmits an ACK in a period from time t115 at which a certain time has elapsed from time t114 to time t116. The access point 1110 receives the ACK using the wireless LAN signal demodulating unit 1208 (receiving unit) and executes a predetermined process corresponding to reception of the ACK.

Next, the access point 1110 generates and transmits a BACKR for requesting the station 1111 to transmit a BACK in a period from time t117 at which a certain time has elapsed from time t116 to time t118.

Next, the station 1111 transmits the BACK in a period from time t119 at which a certain time has elapsed from time t118 to time t120. The access point 1110 receives the BACK using the wireless LAN signal demodulating unit 1208 (receiving unit) and executes a predetermined process corresponding to reception of the BACK.

In accordance with the above-described seventh embodiment, the station which transmits an ACK first transmits the ACK. That is, ACKs, which are response signals, are transmitted successively in a time domain from the station 1111 configured in the same standard as that of the access point 1110 and the conventional station 1113 configured in a previous standard. Thus, it is possible to perform spatial division multiplexing for the station 1111 and the station 1113.

Although the embodiments of the present invention have been described above in detail with reference to the drawings, specific configurations are not limited to the embodiments, and a design and the like without departing from the gist of the present invention may also be included.

INDUSTRIAL APPLICABILITY

The present invention is applicable to, for example, a wireless communication system. In accordance with the present invention, it is possible to reduce interference in cooperative transmission using interference suppression technology. In addition, in accordance with the present invention, an access point can perform spatial multiplexing transmission in the same frequency at the same time for a station configured in the same standard as that of the access point and a station configured in a previous standard.

DESCRIPTION OF REFERENCE SIGNS

200-1, 200-2 access point
201-1, 201-2 station
100-1 to 100-A Error-correction coding unit
101-1 to 101-A Interleaving processing unit
103-1-1 to 103-B-A Subcarrier modulating unit
104 Weighting processing unit
105-1 to 105-C IFFT unit
106-1 to 106-C GI adding unit
107-1 to 107-1C RF processing unit
108-1 to 108-C Antenna
109 Preamble generating unit
110 Pilot subcarrier generating unit
111 Wireless signal demodulating unit
112 Propagation channel acquiring unit
113 Weight calculating unit
114 Weighting processing unit for preamble signal
115 Extracting unit
116 Preamble storing unit
300-1 to 300-D Antenna
301-1 to 301-D Wireless unit
302 Propagation channel performance measuring unit
303 Storage unit
304 Propagation channel performance notifying unit
1110 Access point
1111 Station (of same standard as that of station 1110)
1113 Station (of standard before standard of station 1110)
1201-1 to 1201-A S/P converting unit
1202-1-1 to 1202-B-A Subcarrier modulating unit
1203 Weighting processing unit
1204-1 to 1204-C IFFT unit
1205-1 to 1205-C GI adding unit
1206-1 to 1206-C RF processing unit
1207-1 to 1207-C Antenna
1208 Wireless LAN signal demodulating unit
1209 Propagation channel acquiring unit
1210 Weight calculating unit
1211 Weight interpolating unit
1212 Known signal generating unit
1213 Common signal generating unit
1214 Known signal generating unit
1301-1 to 1301-D Antenna
1302-1 to 1302-D Wireless LAN signal demodulating unit
1303 Propagation channel performance measuring unit
1304 Storage unit
1305 Propagation channel performance notifying unit
1306-1 to 1306-D Conventional wireless LAN signal demodulating unit

The invention claimed is:

1. A wireless signal transmitting method in which at least one access point among a plurality of access points each constituting a different communication cell transmits a wireless signal on which directivity control has been performed to stations, the wireless signal transmitting method comprising:
   generating a preamble signal to be added to the wireless signal, the preamble signal being used to perform timing synchronization and frequency synchronization;
   generating a pilot subcarrier signal that is used to correct a residual frequency error;
   performing weighting on a data signal to which the pilot subcarrier signal has been added and outputting a wireless signal;
   extracting a propagation channel corresponding to a subcarrier in which the preamble signal is transmitted from among propagation channels acquired from the stations;
   calculating a weight based on the extracted propagation channel and performing weighting on the preamble signal; and
   transmitting the wireless signal on which the weighting has been performed and the preamble signal on which the weighting has been performed which is added to the wireless signal on which the weighting has been performed.

2. The wireless signal transmitting method according to claim 1,
   wherein, said weighting performed on the preamble signal is performed using a weighted preamble signal that is pre-calculated by multiplying the preamble signal by the weight calculated based on the propagation channel corresponding to the subcarrier in which the preamble signal is transmitted, and
   in the wireless processing step, the weighted preamble signal is added to the wireless signal and transmitted.

3. The wireless signal transmitting method according to claim 2, further comprising storing the pre-calculated weighted preamble signal, wherein, at a predetermined transmission timing, the weighted preamble signal stored in the storing step is read, and the read weighted preamble signal is added to the wireless signal and transmitted.

4. A wireless apparatus which transmits a wireless signal on which directivity control has been performed to stations in a wireless system including a plurality of wireless apparatuses each constituting a different communication cell, the wireless apparatus comprising:
   a preamble signal generator which outputs a preamble signal to be added to the wireless signal, the preamble signal being used to perform timing synchronization and frequency synchronization;
   a pilot subcarrier signal generator which outputs a pilot subcarrier signal that is used to correct a residual frequency error;
   a weighting processor programmed to perform weighting on a data signal to which the pilot subcarrier signal has been added and programmed to output a wireless signal;
   an extraction circuit which extracts a propagation channel corresponding to a subcarrier in which the preamble signal is transmitted from among propagation channels acquired from the stations;
   a preamble signal weighting processor programmed to calculate a weight based on the propagation channel extracted by the extraction circuit and programmed to perform the weighting on the preamble signal using the weight; and
   a wireless transmitter which transmits the wireless signal on which the weighting has been performed and the preamble signal on which the weighting has been performed which is added to the wireless signal on which the weighting has been performed.

5. The wireless apparatus according to claim 4,
   wherein the preamble signal weighting processor pre-calculates a weighted preamble signal by multiplying the preamble signal by the weight calculated based on the propagation channel corresponding to the subcarrier in which the preamble signal is transmitted, and
   the wireless transmitter adds the weighted preamble signal to the wireless signal and performs transmission.

6. The wireless apparatus according to claim 5, further comprising a preamble storing memory which stores the weighted preamble signal pre-calculated by the preamble signal weighting processor,
   wherein, at a predetermined transmission timing, the wireless transmitter reads the weighted preamble signal stored in the memory, adds the read weighted preamble signal to the wireless signal, and performs transmission.

7. A wireless signal transmitting method in which an access point transmits a wireless signal on which spatial division multiplexing has been performed to a first receiving station configured to apply a first set of rules defining transmissions and a second receiving station configured to apply a second set of rules defining transmissions that include transmissions not supported by the first set of rules, the wireless signal transmitting method comprising:
   generating L-STF as a known signal;
   performing weighting on all input signals starting from L-LTF; and
   transmitting a transmission signal in which the known signal has been added to the input signals on which the weighting has been performed.

8. The wireless signal transmitting method according to claim 7, further comprising:
   calculating weight coefficients for part of subcarriers based on propagation channel information provided from the first receiving station and the second receiving station; and
   calculating weight coefficients of the remaining subcarriers based on the weight coefficients for the part of the subcarriers,
   wherein, the weighting is performed based on the weight coefficients calculated in the weight calculating step and the weight coefficients calculated in the weight interpolating step.

9. The wireless signal transmitting method according to claim 8, further comprising first transmitting between the first receiving station and the second receiving station a response signal from a receiving station configured to apply said first set of rules.

10. A wireless signal transmitting method in which an access point transmits a wireless signal on which spatial division multiplexing has been performed to a first receiving station configured to apply a first set of rules defining transmissions and a second receiving station configured to apply a second set of rules defining transmissions that include transmissions not supported by the first set of rules, the wireless signal transmitting method comprising:
   generating, as a common signal, L-STF, L-LTF, L-SIG, HT-SIG, and a pilot subcarrier signal;
   performing weighting on all input signals starting from VH-SIG-A excluding the pilot subcarrier signal; and
   transmitting a transmission signal in which the common signal is added to the input signals on which the weighting has been performed.

11. The wireless signal transmitting method according to claim 10, further comprising first transmitting between the first receiving station and the second receiving station a response signal from a receiving station configured to apply said first set of rules.

12. A wireless signal transmitting method in which an access point transmits a wireless signal on which spatial division multiplexing has been performed to a first receiving station configured to apply a first set of rules defining transmissions and a second receiving station configured to apply a second set of rules defining transmissions that include transmissions not supported by the first set of rules, the wireless signal transmitting method comprising:
   generating, as a known signal, L-STF and a pilot subcarrier signal;
   performing weighting on all input signals starting from L-LTF excluding the pilot subcarrier signal; and
   transmitting a transmission signal in which the known signal has been added to the input signals on which the weighting has been performed.

13. The wireless signal transmitting method according to claim 12 further comprising first transmitting between the first receiving station and the second receiving station a response signal from a receiving station configured to apply said first set of rules.

14. A wireless apparatus which transmits a wireless signal on which spatial division multiplexing has been performed to a first receiving station configured to apply a first set of rules defining transmissions and a second receiving station configured to apply a second set of rules defining transmissions that include transmissions not supported by the first set of rules, the wireless apparatus comprising:
   a signal generator which outputs L-STF as a known signal;
   a weighting processor programmed to perform weighting on all input signals starting from L-LTF; and a wireless transmitter which transmits a transmission signal in which the known signal is added to the input signals on which the weighting has been performed by the weighting processor.

15. The wireless apparatus according to claim 14, further comprising:
   a weight calculating processor programmed to calculate weight coefficients for part of subcarriers based on propagation channel information provided from the first receiving station and the second receiving station; and
   a weight interpolating processor programmed to calculate weight coefficients of the remaining subcarriers based on the weight coefficients for the part of the subcarriers, and
   the weighting processor is programmed to perform the weighting based on the weight coefficients calculated by the weight calculating processor and the weight coefficients calculated by the weight interpolating processor.

16. A wireless apparatus which transmits a wireless signal on which spatial division multiplexing has been performed to a first receiving station configured to apply a first set of rules defining transmissions and a second receiving station configured to apply a second set of rules defining transmissions that include transmissions not supported by the first set of rules in a wireless system including at least one wireless apparatus, the wireless apparatus comprising:
   a common signal generator which generates, as a common signal, L-STF, L-LTF, L-SIG, HT-SIG, and a pilot subcarrier signal;
   a weighting processor programmed to perform weighting on all input signals starting from VH-SIG-A excluding the pilot subcarrier signal; and
   a wireless transmitter which transmits a transmission signal in which the common signal is added to the input signals on which the weighting has been performed by the weighting processor.

17. A wireless apparatus which transmits a wireless signal on which spatial division multiplexing has been performed to a first receiving station configured to apply a first set of rules defining transmissions and a second receiving station configured to apply a second set of rules defining transmissions that include transmissions not supported by the first set of rules in a wireless system including at least one wireless apparatus, the wireless apparatus comprising:
   a signal generator which outputs, as a known signal, L-STF and a pilot subcarrier signal;
   a weighting processor programmed to perform weighting on all input signals starting from L-LTF excluding the pilot subcarrier signal; and
   a wireless transmitter which transmits a transmission signal in which the known signal is added to the input signals on which the weighting has been performed by the weighting processor.

* * * * *